(12) United States Patent
Hansbrough et al.

(10) Patent No.: US 12,093,509 B2
(45) Date of Patent: *Sep. 17, 2024

(54) DISPLAY OF DATA IN IMAGES AS DATA STRUCTURES

(71) Applicant: Oracle International Corporation, Redwood Shores, CA (US)

(72) Inventors: Reginald Hansbrough, Celina, TX (US); Sergio Acosta, Zapopan (MX); Victor Medina, Tlaquepaque (MX); Lakshmi Dontamsetti, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,131

(22) Filed: Feb. 24, 2023

(65) Prior Publication Data

US 2023/0244359 A1 Aug. 3, 2023

Related U.S. Application Data

(63) Continuation of application No. 17/142,034, filed on Jan. 5, 2021, now Pat. No. 11,614,857, which is a continuation-in-part of application No. 15/693,330, filed on Aug. 31, 2017, now Pat. No. 10,917,587.

(60) Provisional application No. 62/514,693, filed on Jun. 2, 2017.

(51) Int. Cl.
*G06F 3/0482* (2013.01)
*G06F 3/04845* (2022.01)
*G06F 40/177* (2020.01)
*G06F 40/279* (2020.01)
*G06V 30/10* (2022.01)

(52) U.S. Cl.
CPC ........ *G06F 3/0482* (2013.01); *G06F 3/04845* (2013.01); *G06F 40/177* (2020.01); *G06F 40/279* (2020.01); *G06F 2203/04803* (2013.01); *G06V 30/10* (2022.01)

(58) Field of Classification Search
CPC .. G06F 3/04845; G06F 40/177; G06F 40/279; G06F 2203/04803; G06F 3/0482; G06T 2200/24; G06T 11/206; G06T 11/60; G06V 30/10
See application file for complete search history.

(56) References Cited

U.S. PATENT DOCUMENTS

| | | | |
|---|---|---|---|
| 9,251,413 B2 * | 2/2016 | Meier | G06V 30/412 |
| 9,524,429 B2 * | 12/2016 | Zhang | G06V 30/412 |
| 10,740,638 B1 * | 8/2020 | Annis | G06V 30/412 |
| 10,853,565 B2 * | 12/2020 | Yu | G06F 40/177 |

(Continued)

*Primary Examiner* — Shahbaz Nazrul
(74) *Attorney, Agent, or Firm* — Trellis IP Law Group, PC

(57) ABSTRACT

Implementations generally relate to importing data and presenting the data in a user interface (UI). In some implementations, a method includes capturing an image of an object using a camera, where the object includes text. The method further includes recognizing the text and recognizing data in a table. The method further includes generating a data structure that includes the text or the data in the table. The method further includes generating a graphical image that represents at least a portion of the text or the data in the table. The method further includes displaying the graphical image in a UI in a display screen of a client device.

20 Claims, 19 Drawing Sheets

(56) References Cited

U.S. PATENT DOCUMENTS

| | | | | |
|---|---|---|---|---|
| 11,182,604 | B1* | 11/2021 | Methaniya | G06V 30/412 |
| 11,200,413 | B2* | 12/2021 | Burdick | G06F 40/284 |
| 2015/0242456 | A1* | 8/2015 | Cannon | H04L 65/403 |
| | | | | 707/608 |
| 2019/0102620 | A1* | 4/2019 | Siddiq | G06F 16/24575 |
| 2019/0340240 | A1* | 11/2019 | Duta | G06V 30/15 |
| 2022/0012414 | A1* | 1/2022 | D'Oria | G06F 16/16 |
| 2022/0318224 | A1* | 10/2022 | Thompson | G06V 30/413 |
| 2022/0319217 | A1* | 10/2022 | Paliwal | G06V 10/82 |

* cited by examiner

Lorem ipsum dolor sit amet, consectetur adipiscing elit, sed do eiusmod tempor incididunt ut labore et dolore magna aliqua. Quam lacus suspendisse faucibus interdum posuere lorem ipsum. Tellus in metus vulputate eu scelerisque felis. In nibh mauris cursus mattis molestie. Eu lobortis elementum nibh tellus molestie nunc non blandit massa. Odio eu feugiat pretium nibh ipsum consequat nisl vel. Cursus mattis molestie a iaculis. Cursus risus at ultrices mi tempus imperdiet nulla malesuada. Feugiat nisl pretium fusce id velit ut tortor. Dignissim cras tincidunt lobortis feugiat vivamus.

Sociis natoque penatibus et magnis dis parturient. Quam pellentesque nec nam aliquam sem et tortor consequat id. Rhoncus est pellentesque elit ullamcorper dignissim cras tincidunt. Ut tristique et egestas quis ipsum suspendisse.In cursus turpis massa tincidunt dui ut ornare lectus. Duis at consectetur lorem donec. Non enim praesent elementum facilisis leo. Nibh mauris cursus mattis molestie a iaculis at.

| Segment | Country | Units Sold | Cost | Sales Price |
|---|---|---|---|---|
| Government | Canada | 16,000 | $15.20 | $90.00 |
| Government | United States | 130,000 | $14.37 | $97.00 |
| Midmarket | France | 21,000 | $5.10 | $23.00 |
| Midmarket | Germany | 18,000 | $5.50 | $19.00 |
| Midmarket | Mexico | 24,000 | $3.77 | $11.50 |

Cursus turpis massa tincidunt dui ut ornare lectus sit. Massa tincidunt dui ut ornare lectus. At varius vel pharetra vel turpis nunc eget lorem. Sed sed risus pretium quam vulputate dignissim suspendisse in. Faucibus interdum posuere lorem ipsum. Urna neque viverra justo nec. Auctor neque vitae tempus quam pellentesque nec nam aliquam. Nibh mauris cursus mattis molestie a iaculis.

Legend:
------- Paragraph boundary
·········· Column boundary
———— Table boundary

FIG. 15

DISPLAY OF DATA IN IMAGES AS DATA STRUCTURES

CROSS REFERENCES TO RELATED APPLICATIONS

This application is a continuation of U.S. patent application Ser. No. 17/142,034, entitled IMPORTING, INTERPRETING, AND PRESENTING DATA, filed on Jan. 5, 2021 which is a continuation-in-part of U.S. patent application Ser. No. 15/693,330, entitled IMPORTING AND PRESENTING DATA, filed on Aug. 31, 2017, which claims priority from, and the benefits of U.S. Provisional Patent Application Ser. No. 62/514,693, entitled IMPORTING AND PRESENTING DATA, filed on Jun. 2, 2017, which are all hereby incorporated by reference as if set forth in full in this application for all purposes.

This application is related to the following applications, U.S. Pat. No. 10,516,980, entitled AUTOMATIC REDISPLAY OF A USER INTERFACE INCLUDING A VISUALIZATION, issued on Dec. 24, 2019, which claims priority to U.S. Provisional Patent Application Ser. No. 62/246,031, entitled DAY-BY-DAY, filed on Oct. 24, 2015, which are hereby incorporated by reference as if set forth in full in this application for all purposes.

SUMMARY

Implementations generally relate to importing data and presenting the data in a user interface (UI). Implementations use a camera to capture an image that includes text. Implementations recognize the text, import data based on the recognized text, and display the data in a UI overlaying the image, which provides a user with immediate feedback on the recognition process. Implementations may further generate a data structure that includes the recognized text, generate a graphical image that represents at least a portion of the recognized text, and show the graphical image in a user interface on a display screen of a client device.

Embodiments of the invention further interactively assist a user to obtain the desired data by searching for tabular data (tables containing information). The user captures or imports an image. The embodiment scans the image for the tabular data and prepares the image for cropping to a target data area based on detected information. The embodiment lets the user adjust the target data area such that a larger, smaller, or different area is cropped. The embodiment gives the user the option to add additional columns, rows, or pages by going through the same process again. When the user wishes to add no more data, the embodiment displays a summary of the scan. It may allow the user to make final adjustments, for example by allowing to change the detected data types. The embodiment may then further process and/or store the captured data.

In some implementations, an apparatus includes one or more processors, and includes logic encoded in one or more non-transitory computer-readable storage media for execution by the one or more processors. When executed, the logic is operable to perform operations including capturing an image of an object using a camera, where the object includes text. The logic when executed is further operable to perform operations including recognizing the text using an information detection engine (IDE), generating a data structure that includes the recognized text, and generating a data visualization that represents at least a portion of the text. The logic when executed is further operable to perform the above operations including displaying the data visualization in a UI in a display screen of a client device.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 15 illustrates an image of an object with text paragraphs and tabular data that may be detected by implementations described herein.

Figure 1:
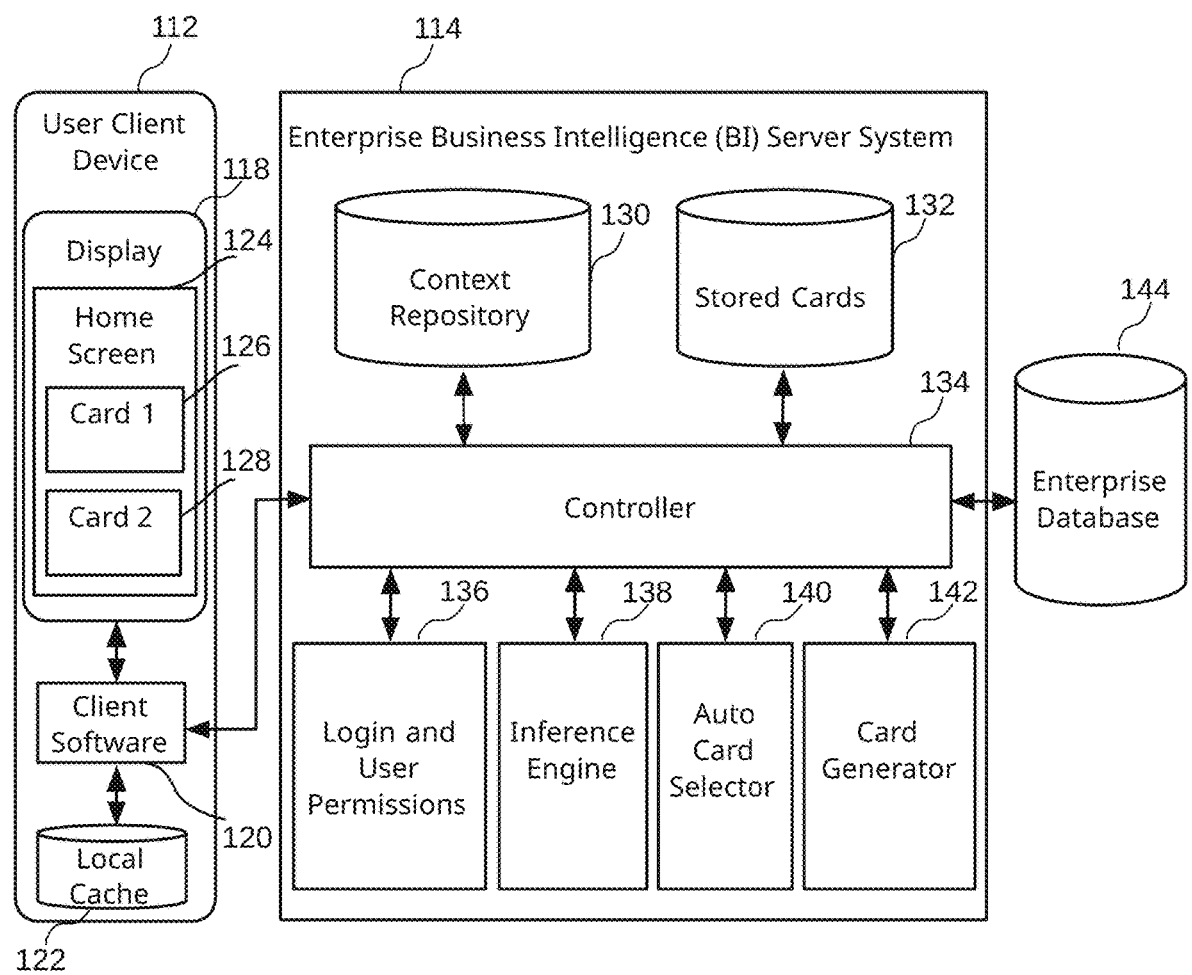
FIG. 1 illustrates a block diagram of an example computing environment, which may be used for implementations described herein.

In the figures, like reference numbers may indicate functionally similar elements. The systems and methods illustrated in the figures, and described in the Detailed Description below, may be arranged and designed in a wide variety of different embodiments. Neither the figures, nor the Detailed Description, are intended to limit the scope as claimed. Instead, they merely represent examples of different embodiments of the invention.

DETAILED DESCRIPTION

Implementations described herein import data and present the data in a user interface (UI). As described in more detail herein, implementations use a device's camera to capture an image that includes text (e.g., text on a sheet of paper or other surface, etc.), where the text may include letters, digits, symbols, emoji, and characters known in any alphabet or any non-alphabetic writing system, including letter arrangements in Hangeul and Chinese characters, and generally any items captured in, for example, Unicode. The image may further include organized information, such as tables, graphs, or visualizations. Implementations use an information detection engine (IDE) to recognize and process the text, using a recognition technique such as optical character recognition (OCR) that may be enhanced by machine learning; using methods to detect structure in the recognized data as described herein; and import data based on the recognized text and recognized information. Implementations may present the data in a UI while the text is being captured, which provides a user with immediate feedback on the recognition process. Implementations also manipulate the underlying data derived from the image to generate various graphical representations (e.g., tables, bar charts, pie charts, and any other data visualizations) that represent the captured text.

In some implementations, a system captures an image of an object using a camera, where the object includes text and/or other information. The system recognizes the text and/or other information in the object, generates a data structure that includes the recognized text and/or other information, and generates a graphical image that represents at least a portion of the data in the data structure. The system displays the graphical image in a UI in a display screen of a client device.

As described in more detail herein, implementations utilize a device's camera and optical character recognition (OCR) technology to detect the presence of data (e.g., tabular data) within the device's viewfinder. Implementations import any viewed data to the device. Once imported, implementations enable a user to manipulate the data in any manner consistent with a typical project. In various implementations, while the user is viewing the data through the viewfinder, implementations give a user an option to have a wireframe (e.g., table) representing the data overlaid in real-time. This enables the user to determine the completeness of the data or data set being imported.

In addition to providing a wireframe of the data, implementations enable a user to have an analytics-based augmented reality (AR) experience by overlaying an actual chart of the data in place of the tabular wireframe. The type of chart may vary depending on the number of measures (e.g., number columns, etc.) and dimensions (e.g., text columns, rows, pages, etc.).

The following are definitions to provide further context and applications of implementations described herein. In various implementations, an enterprise may be any organization of persons, such as a business, university, government, military, and so on. The terms "organization" and "enterprise" are employed interchangeably herein. Personnel of an organization, e.g., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, and so on, of an enterprise. The terms "ERP software," "ERP application," and "enterprise software" may be employed interchangeably herein. However, an ERP application may include one or more ERP software modules or components, such as user interface (UI) software modules or components.

Enterprise software applications, such as customer relationship management (CRM), business intelligence (BI), and project management software, often include databases with various database objects, also called data objects or entities. For the purposes of the present discussion, a database object may be any computing object maintained by a database. A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

For the purposes of the present discussion, software functionality may be any function, capability, or feature, e.g., stored or arranged data, that is provided via computer code, e.g., software. Generally, software functionality may be accessible via use of a UI and accompanying UI controls and features. Software functionality may include actions, such as retrieving data pertaining to a computing object (e.g., business object); performing an enterprise-related task, such as scheduling a meeting, promoting, hiring, and firing enterprise personnel, placing orders, calculating analytics, launching certain dialog boxes, performing searches, and so on.

Such tasks may represent or be implemented via one or more software actions. A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, and so on. The terms "software action" and "action" are employed interchangeably herein.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, a server may be any computing resource, such as a computer and/or software that is adapted to provide content, e.g., data and/or functionality, to another computing resource or entity that requests it, e.g., the client. A client may be any computer or system that is adapted to receive content from another computer or system, called a server. A service-oriented architecture (SOA) server may be any server that is adapted to facilitate providing services accessible to one or more client computers coupled to a network.

A networked computing environment may be any computing environment that includes intercommunicating computers, e.g., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain or server system herein. For the purposes of the present discussion, a computing domain may be any collection of one or more servers running software that is managed by a single administrative server or associated application. An example of a computing domain is a web logic server (WLS) domain.

When the term "domain" is used herein with reference to a database, e.g., an enterprise database, the database describes the domain. For example, a CRM database is said to characterize a CRM domain, which may include a set of related computing objects characterizing customer relationship management data and functionality.

A cloud service may be any mechanism (e.g., one or more web services, application programming interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software) may subscribe to and access enterprise software by subscribing to a particular suite of cloud services offered via the enterprise software. Various components of the enterprise software may be distributed across resources (e.g., servers) of a network.

For clarity, certain well-known components, such as hard drives, processors, operating systems, power supplies, routers, the Internet, administration servers, server cluster controllers, process schedulers, virtual machines, database management systems, mobile device managers, synchronization engines, Application Programming Interfaces (APIs), web services, and so on, are not necessarily explicitly called out in the figures. However, those skilled in the art with access to the present teachings will know which components to implement and how to implement them to meet the needs of a given implementation.

FIG. 1 illustrates a block diagram of an example computing environment 100, which may be used for implementations described herein. In various implementations, computing environment 100 is configured to enable selective context-based enterprise business intelligence (BI) content delivery to one or more mobile computing devices such as user client device 112, or client device 112, leveraging both intrinsic context (e.g., representing user-specified selections, conditions, etc.) and extrinsic context (e.g., overall system usage history, physical device location, user team membership, user data access permissions, etc.).

For the purposes of the present discussion, context information may be any metadata (e.g., data about or otherwise associated with other data or computing objects or entities) that may be associated with a user, user interaction with a computing device, a computing device (including software used by the computing device), and so on. The terms "context information" and "context" may be employed interchangeably herein.

A mobile device, also called a mobile computing device, may be any computer that is adapted for portable use. A computer may be any processor coupled to memory. Examples of mobile computing devices include laptops, notebook computers, smartphones, and tablets (e.g., iPhone, iPad, Galaxy Tab, Windows Mobile smartphones, Windows smartphones and tablets, Android smartphones and tablets, Blackberry smartphones, and so on), etc.

Intrinsic context information may be any context information that is specifically chosen or specified by the user, e.g., via user input. Examples of intrinsic context information characterizing information sought by a user include natural language query statements and expressions, user-specified bring back conditions, and so on. A bring back condition may be any user-specified data that when true, may be used to redisplay or retrieve content associated with the condition when the condition is met, as determined by the system with reference to extrinsic context information. Examples of bring back conditions are discussed more fully below.

Extrinsic context information may be any context information that is not explicitly chosen or specified by a user so as to affect software operation. Examples of extrinsic context information include user data access permissions (e.g., associated with user login credentials), user computing device location devices such as a global positioning system (GPS) receivers, user teams or collaboration groups, business tasks assigned to a user, projects that a user is working on, data characterizing a history of user interaction with computing environment 100, time of day, day of week, date, contact lists, information about who has recently contacted a user and where and how they were contacted, and so on. Extrinsic context information may also include aggregated metrics calculated from analysis of activities of plural users of computing environment 100 (e.g., all authorized users interacting with computing environment 100), and so on.

Computing environment 100 may leverage both intrinsic and extrinsic context to facilitate efficient timely delivery of relevant business intelligence (BI) content (e.g., analytics) to users, as discussed more fully below.

Business context information may include any context information that is related to a business entity, e.g., a resource, software application, employee, enterprise task, opportunity, contact, and so on. The terms "business context information" and "business context" are employed interchangeably herein.

As it pertains to natural language processing (NLP), e.g., mechanisms for generating machine interpretations of natural language expressions, context information may include any information that may be employed to inform natural language processing to estimate user intent or meaning of natural language or portions thereof. User intent of a portion of natural language is said to be estimated if a meaning is associated with or attributed to the portion of natural language. Accordingly, context information may include any information pertaining to natural language input, including, but not limited to user data, such as user location information, calendar entries, appointments, business cycle information, contacts, employee performance metrics, user data access permissions or authentication level, and so on.

As it pertains to software visualizations (e.g., analytics and associated charts, graphs, diagrams, etc.), context information may include any information that is auxiliary to source data used to display a visualization. Source data may be any data used to build a structure of a visualization. For example, a corporate organizational chart may use employee names, employee enterprise roles, and hierarchal rules applicable to enterprise roles as source data to construct the organizational chart. In this example, context information may include, for example, information indicating that a user is seeking information as to whether a particular decision made by a particular employee was approved by the appropriate persons, or that the user is on a project pertaining to corporate compensation levels and may wish to ensure that higher level employees are not compensated less than lower-level employees, and so on.

In some implementations, the computing environment 100 may collect context information via various mechanisms, such as via one or more user responses to a query; user answers to a questionnaire; monitoring of user software usage history; location information, and so on.

Context information is said to be associated with a user if the context information is associated with a device or software accessible to the user. For example, a mobile phone user may be employing a mobile device with a GPS receiver. The mobile device is said to be associated with the user, as is GPS location information provided by the GPS receiver thereof. Similarly, a user employing calendar software may enter appointments. Appoint information stored via the calendar software is associated with the user.

Accordingly, context information associated with a user (also called individual user context information) may include any context information pertaining directly to the user or pertaining to one or more tasks, opportunities, or other computing objects (e.g., business objects) that are associated with or otherwise employed by the user or used by software employed by the user).

Note that in certain embodiments discussed herein, user context information may be derived, in part, with reference to a permissions database that stores user enterprise access permissions, e.g., software and data access and user privileges. Note that user data may be any context information characterizing or otherwise associated with a user of software and/or hardware. For example, user data may include enterprise software permissions (e.g., privileges), job qualifications, such as work experience, education and related degrees, awards, and so on. User data may further include, for example, user job preferences, such as location, employer, vacation time allowed, hours worked per week, compensation (e.g., salary), and so on.

User privileges information may be any permissions or specification of permissions associated with a user, where the permissions specify whether or not and/or how a user may access or use data, software functionality, or other enterprise resources. Accordingly, user privileges information, also simply called user permissions or user privileges, may define what a user is permitted or not permitted to do in association with access to or use of enterprise resources, such as computing resources.

User job role information may include any data characterizing a position or description of a position held by the user at an enterprise. Accordingly, job role information may be a type of context information associated with the user, where the context information may also include user privileges information associated with the job role, e.g., position. For example, if a user is a system administrator employee, the user may have special permissions to change system configuration parameters and may then have access to various types of visualizations characterizing system architecture, operations, and so on.

In some implementations, the one or more mobile computing devices (e.g., client device 112) (e.g., smartphone, tablet, laptop, etc.) communicate with an enterprise business intelligence (BI) server system 114 via a network, such as the Internet. BI server system 114 communicates with back-end enterprise databases 144 (which may include warehouses or collections of databases), e.g., BI, HCM, CRM databases, and so on.

Note that various modules of the computing environment 100 may be grouped, arranged, coupled, and/or distributed differently than shown, without departing from the scope of the present teachings. For example, in an alternative grouping, enterprise databases 144 may be considered as part of BI server system 114. Similarly, some software functionality provided by BI server system 114 and enterprise databases 144 may be offloaded to client device 112 (e.g., mobile device, etc.), e.g., enterprise content may be cached locally on the client device 112 and used in an offline mode, as discussed more fully below. Similarly, in certain implementations, interconnections between modules may be different than those shown.

In various implementations, client device 112 includes a display 118 for presenting UI display screens, such as a home screen 124, also called an activity screen, dashboard, smart feed of BI content, or simply feed.

For the purposes of the present discussion, a user interface display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or card (where a card may represent a sub-UI display screen within a larger UI display screen). Views or windows may include sections, such as sub-views or sub-windows, dialog boxes, graphs, tables, UI cards, and so on. In certain cases, a UI display screen may refer to all application windows presently displayed on a display.

For the purposes of the present discussion, a UI card may be a UI display screen section. In various embodiments discussed herein UI cards may contain specific categories of content and associated enterprise data and/or analytics, as discussed more fully below.

The example home screen or smart feed 124 of client device 112 includes a scrollable listing if UI cards, including a first example card 126 (e.g., content 1) and a second example card 128 (e.g., content 2). Examples of UI card types include analytic cards, detailed information cards, email cards, calendar cards, report cards, trending-data cards (also called "what's trending" cards), shared cards, activity summary cards, custom cards, and so on.

In general, content included in example analytic cards discussed herein may include analytics, e.g., interactive visualizations. For the purposes of the present discussion, an analytic may be any calculation or measurement based on a given input. Certain analytics may be displayed graphically. For example, an analytic that calculates a degree of a match between a user and a candidate position based on information about the user and various candidate positions may be displayed via a bar chart. In general, a graphically displayed analytic or other visual representation of data is called a visualization herein.

An interactive visualization may be any visualization that includes or is displayed in association with one or more UI controls enabling user interactions with the visualization and/or underlying data of the visualization. A user interaction may include any user input resulting in an adjustment to an appearance, behavior, type, or other property of a visualization.

Examples of interactions that may be supported by analytic cards discussed herein include drill-down (e.g., selection of a portion or node of a visualization to trigger display of additional details associated with data underlying the portion or node of the visualization), change chart type, pivot (e.g., changing chart axis), filter data, show/hide a group, data hierarchy, dimension, and so on. Note that user interactions and associated UI controls discussed herein with respect to analytic cards are not limited. For example, certain cards may be flipped or rotated to yield additional information; certain cards may support user edits to underlying data of a visualization, and so on.

For the purposes of the present discussion, underlying data may be any data used to generate a visualization, where nodes or components of the visualization may represent one or more objects, database dimensions, features, or other data characteristics. Hence, underlying data may include information and/or functionality represented by or corresponding to a node or visualization component, including link information. For example, a node representing a person in an enterprise organizational chart may be associated with additional underlying data that includes, for example, employee job title, phone number, address, and so on.

In various embodiments discussed herein, underlying data of a visualization may include structured data. Structured data may be any data organized or otherwise accessible in accordance with a data model, e.g., as may be provided via a relational database.

For the purposes of the present discussion, data dimension may be any category or classification of an amount or category. For example, columns of a table may represent data dimensions. The terms "data dimension" and "database dimension" may be employed interchangeably herein.

In the present example embodiment, UI cards 126 and 128 represent a home screen list of analytic cards that may be automatically selected by the system computing environment (as discussed more fully below) to populate home screen 124 based on context information (e.g., with smart feed of UI cards with dynamic BI content, etc.). The context information may include information about what the user has been doing, e.g., user activity, e.g., who recently emailed, texted, or called the user, where the user was when contacted (e.g., where client device 112 associated with the user was), where the user (e.g., client device 112) currently is located (as indicated by the GPS location of client device 112, the current time of day, date, what projects and/or business tasks the user is working on, what teams or enterprise groups the user is associated with, which content the user has been interacting with, user software navigation history, user interaction logs (e.g., tracking usage of computing environment 100), and so on.

Cards that change or update throughout the day, e.g., in approximately real time, to reflect changing context; changing underlying data, etc., are called dynamic cards or dynamically updating cards herein. Note that in certain embodiments discussed herein, automatic selection of cards 126 and 128 are not limited to selections based on individual user context, but may leverage aggregated context information derived or collected from plural users of computing environment 100, including all users of computing environment 100 or subsets thereof. Examples of subsets of users for which context may be aggregated and used include particular enterprise teams, contacts related by social network connections, persons sharing cards with nearby users, and so on.

UI cards 126 and 128 are rendered in part using client software 120. In the present example embodiment, client software 120 (also called a mobile application) includes graphical user interface (GUI) software in communication with speech-to-text software, natural language processing (NLP) software, network communications modules (e.g., mobile synchronization functionality to synchronize communications with BI server system 114 over a network), and so on. Those skilled in the art with access to the present teachings may readily determine, implement, and incorporate appropriate software modules and associated software functionality to meet the needs of a given implementation, without undue experimentation.

Note that in alternative implementations, certain functions of client software 120 may instead be located on BI server system 114 and/or on other servers in communication with BI server system 114. For example, in certain implementations, client software 120 may be implemented via a mobile browser used to access a website hosted by a web server, which in turn uses web services and/or APIs to interface with one or more application servers of BI server system 114 to facilitate updating UI cards 126 and 128.

In the present example embodiment, client software 120 is implemented via a mobile application configured to communicate with and synchronize with a controller module 134 of BI server system 114 to selectively retrieve data (including analytics) needed to implement UI home screen 124 and accompanying UI cards 126 and 128. Data retrieved to the client device 112 during a particular session may be locally cached in a local client-side cache 122. Accordingly, a user of the client device 112 will be able to operate client software 120 and view and interact with cards 126 and 128 that leverage data and/or instructions that are cached in local cache 122.

In various implementations, BI server system 114 leverages functionality provided by various modules 130-142. Controller 134 includes software functionality that facilitates interfacing and using data and functionality from various modules, including a user login and permission module 136, an inference engine 138, an automatic card selection module 140 (also called auto card selector), a card generator module 142, a context information repository 130 (also simply called a context repository 130), stored cards 132 (e.g., stored card content for each user), and one or more enterprise databases 144 (e.g., BI, HCM, CRM, IC, etc.). In various implementations, context repository 130 may include intrinsic user-specified context, extrinsic system-derived context, etc. In some implementations, stored cards 132 may include visualizations.

Note that some of the software functionality provided by modules 130-142 may alternatively and/or additionally be implemented via client software 120. For example, in certain implementations, inference engine 138 may be implemented client-side on client device 112.

In some implementations, controller 134 includes semantic layer interfacing functionality, including online analytical processing (OLAP), additional query term or expression (e.g., natural language input) interpretation (e.g., based on aggregated user context information) functionality, functionality for the mapping of query terms to database dimensions and measures, and so on. In some implementations, controller 134 may include a semantic layer interfacing functionality (e.g., OLAP processing, proposed query term interpretation, mapping of query terms to database dimensions and measures, etc.).

For the purposes of the present discussion, natural language input may be any instruction or information provided via spoken or written (e.g., typed) human language. Examples of language input usable with certain embodiments discussed herein include voice queries and/or commands (which are then converted into text), text messages (e.g., short message service (SMS) text messages), emails containing text, direct text entry, and so on. Natural language input provided to trigger a search for enterprise content is called a natural language query herein.

The login and user permissions module 136 includes computer code for facilitating user login to BI server system 114 (including user authentication and login functionality, etc.). When initially accessing BI server system 114 using client device 112, the user may enter login information (e.g., username and password, biometric information, etc.) or may otherwise submit a biometric sample (e.g., fingerprint scan) to facilitate confirming user identity and application of appropriate restrictions, e.g., data access permissions, to the user client device session with BI server system 114.

Note that user identity and associated data access permissions may represent a type of context information usable by computing environment 100 to selectively adjust content provided via cards 126 and 128. In general, for the purposes of the present discussion, an identity of a user may be any information identifying a user. For example, a user's identity may include login information, email address, phone number, name, biometric sample, and so on. Certain embodiments discussed herein may employ any such identifying information to facilitate, for example, determining a likely command or query term intended by particular language input or software interaction. The identifying information may be further used to associate the user of client device 112 with user-specific data maintained via BI server system 114, e.g., user context information stored in context repository 130, stored cards 132, and so on.

Inference engine 138 includes computer code for facilitating query terms or expression interpretation, e.g., using context information maintained via context repository 130. Inference engine 138 may be used to infer, for example, that the term "profitability" actually refers to a "profit margin" dimension of an OLAP hypercube harvested from enterprise databases 144 via controller 134 and associated interfaces.

Auto card selector module 140 (which may alternatively and/or additionally be implemented client side, e.g., on client device 112, and based on context information) facilitates accessing OLAP hyper cubes; mapping of natural language input expressions into multidimensional expressions (MDX); and selection of card types in accordance with the mappings of the input expressions into database dimensions, measures, analytic calculations, and so on.

Card generator 142 includes computer code for facilitating organizing data for use in visualizations, selections of visualizations in accordance with card type determined by auto card selector 140, collecting rendering data used to render the card, and so on. Note that certain functions of card generator 142 may also be implemented client-side, e.g., generation of card rendering instructions.

Various functional modules 136-142 of BI server system 114 may access data from context repository 130 and from stored cards 132 via interface functionality included in controller 134. The example context repository includes intrinsic user-specified context information, extrinsic system-derived context information, and so on.

Note that the context information maintained by context repository 130 may include dynamic context information, e.g., context information subject to periodic or daily change, including context information subject to approximately real time change. An example of dynamic context information subject to approximately real time change includes GPS location information characterizing client device 112. Additional dynamic context information may include context information indicating who the user is communicating with (and/or has been communicating with), where the user is located, what interactions the user is performing using computing environment 100, when the user is performing the interactions (e.g., communicating, sharing content, following content of other users, and so on), and so on.

Note that the present example embodiment may facilitate dynamic context-based push of BI content to home screen 124, such that home screen 124 is updated periodically or in approximately real time with BI content that is calculated or otherwise determined based in part on dynamic context information.

The dynamic context information may include dynamic extrinsic context information, such as context information that changes based on user interaction with a mobile computing device, e.g., client device 112. The user interaction with the mobile computing device may include moving the device to different locations or regions; automatically updating employee key performance indicators, and so on.

Similarly, non-dynamic context information may include any context information that is not based solely on user interaction with the computing environment 100 via client device 112, e.g., user data access permissions, user name, job role, and so on.

Figure 2:
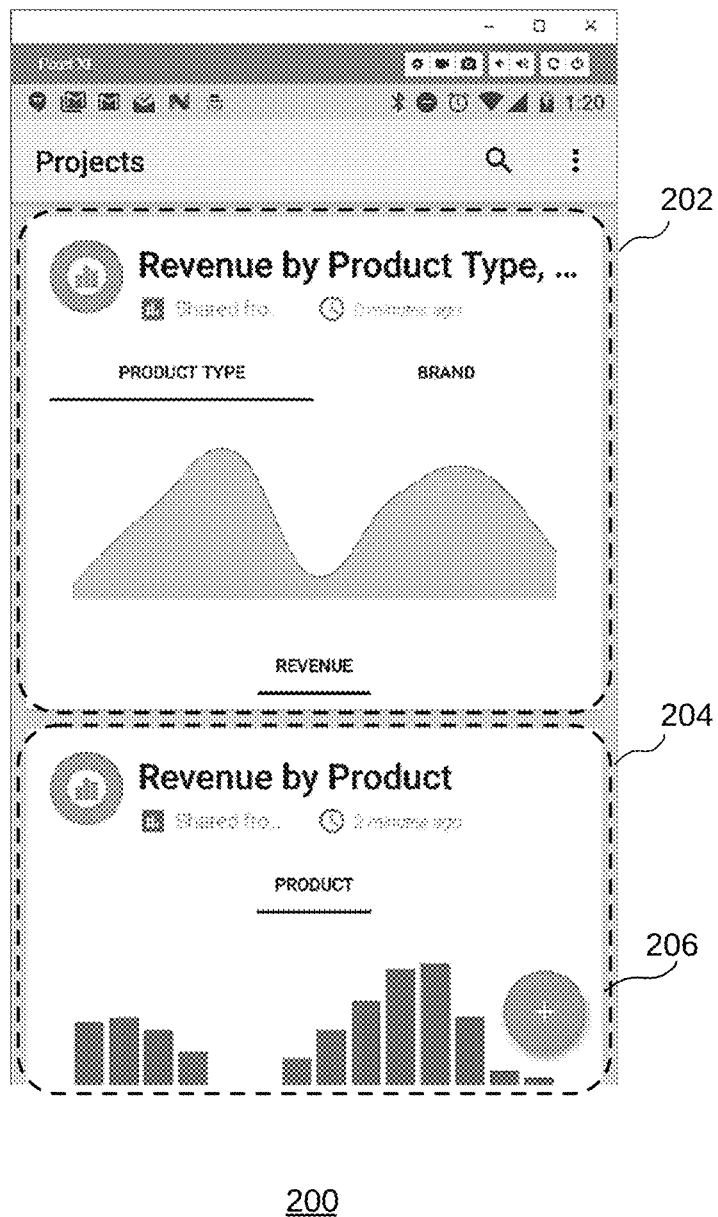
FIG. 2 illustrates an example user interface (UI) displaying graphs, according to some implementations.

FIG. 2 illustrates an example UI 200 displaying graphs 202 and 204, according to some implementations. Shown is a button 206 (e.g., a plus button) that when pressed shows a menu of user selections. Implementations directed to the menu of user selections are described in more detail herein in connection with FIG. 3.

Figure 3:
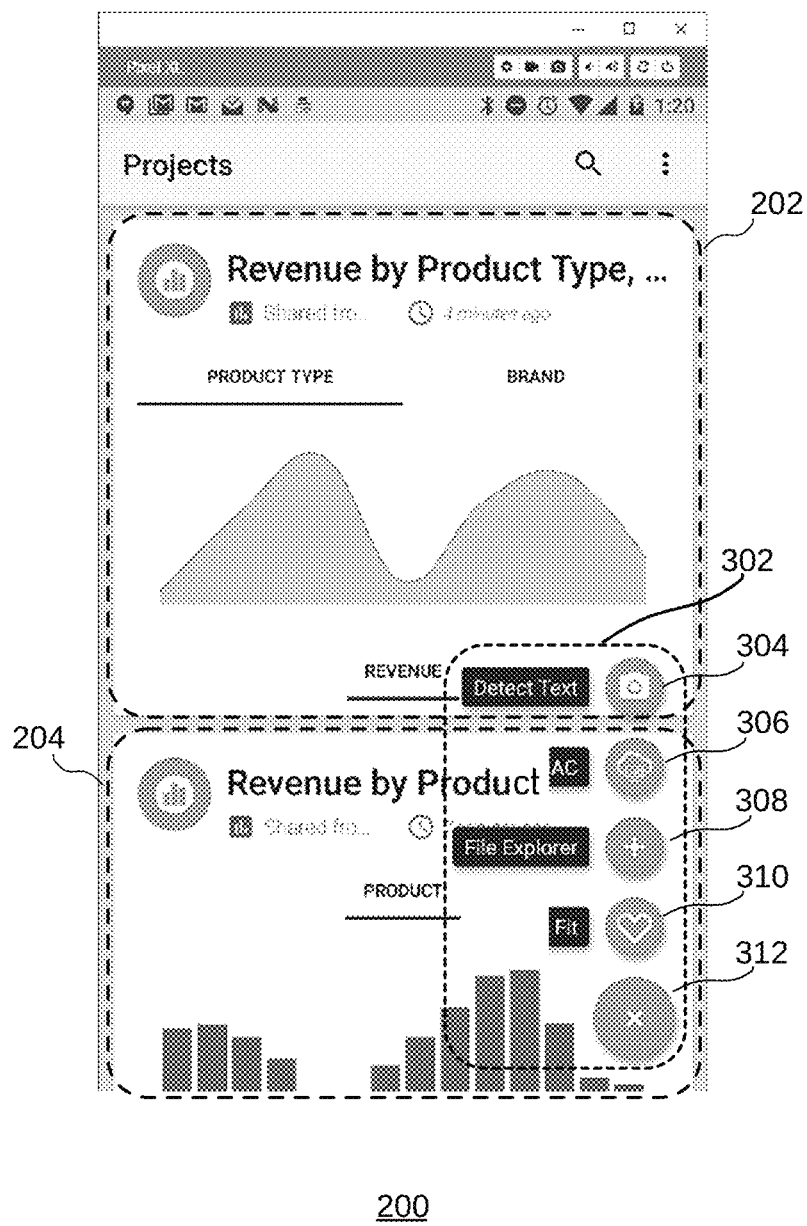
FIG. 3 illustrates an example UI displaying graphs and a menu, according to some implementations.

FIG. 3 illustrates example UI 200 displaying graphs 202 and 204 and a menu 302, according to some implementations. Menu 302 includes various user selections 304, 306, 308, and 310, and a button 312 (e.g., a minus button) to close menu 302. In various implementations, user selections 304, 306, 308, and 310 provide different ways to import data into the application.

In various implementations, the system enables a user to import data from other applications based on user selections 304, 306, 308, and 310. For example, in some implementations, user selection 304 (labeled Detect Text) initiates a process that imports data by detecting text using a camera. Implementations directed to importing data using a camera are described in more detail herein.

In some implementations, user selection 306 (labeled AC) initiates a process that imports data via an analytics cloud or other cloud service. In some implementations, user selection 308 (labeled File Explorer) initiates a process that import data using a file explorer that enables a user to browse files. In some implementations, user selection 310 (labeled Fit) initiates a process that imports data from a mobile device (e.g., a wearable fitness device, etc.).

Figure 4:
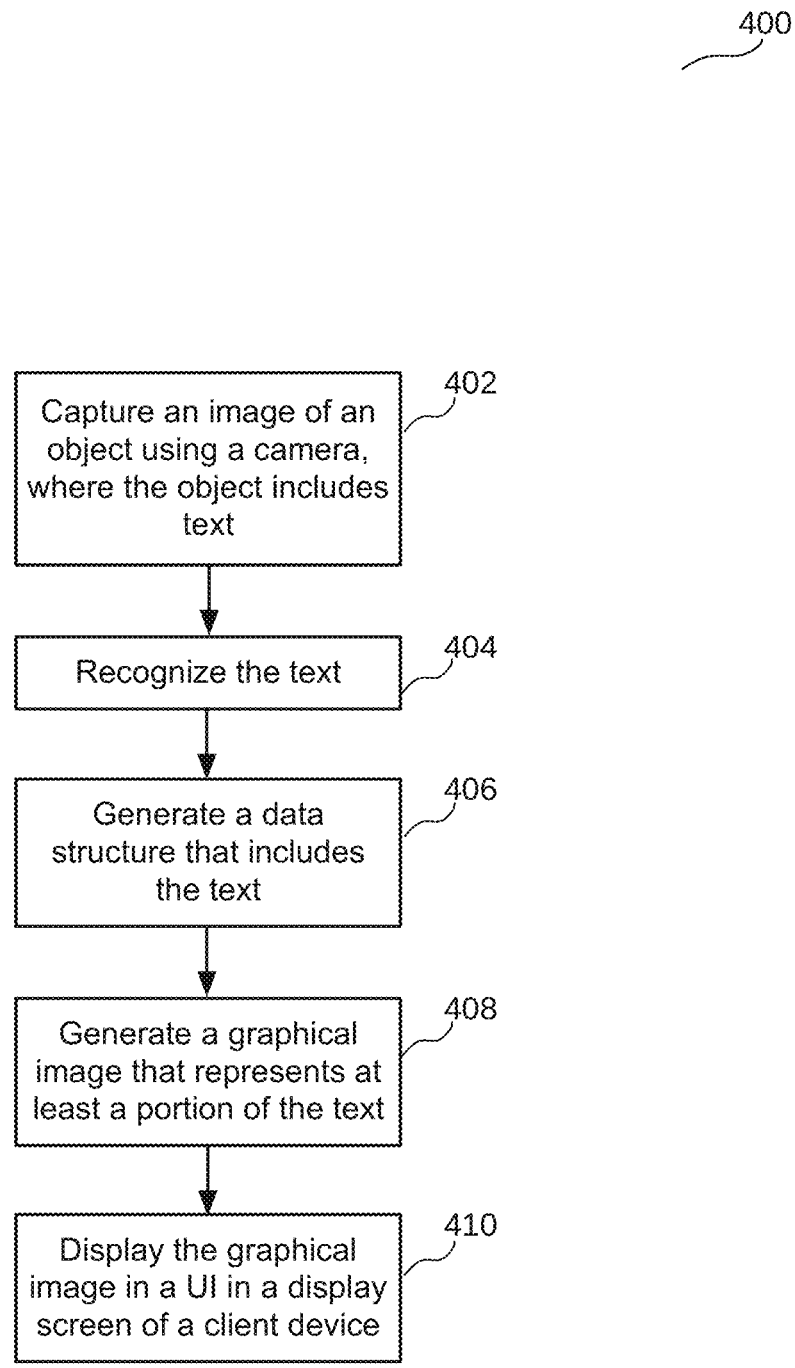
FIG. 4 illustrates an example flow diagram for importing and presenting data, according to some implementations.

FIG. 4 illustrates an example flow diagram 400 for importing and presenting data, according to some implementations. In various implementations, a method is initiated at block 402, where a system such as client device 112 captures an image of an object using a camera. In various implementations, the object includes text. The object may be any object in the real world. For example, the object may be a piece of paper, a wall, dry erase board, another display screen, a photo, etc., where the text is on the surface of the object. As described in more detail herein, the text may include alpha-numeric text, characters, symbols, icons, emoji, and any other information. In various implementations, the text may also include symbols such as mathematical notations.

Figure 5:
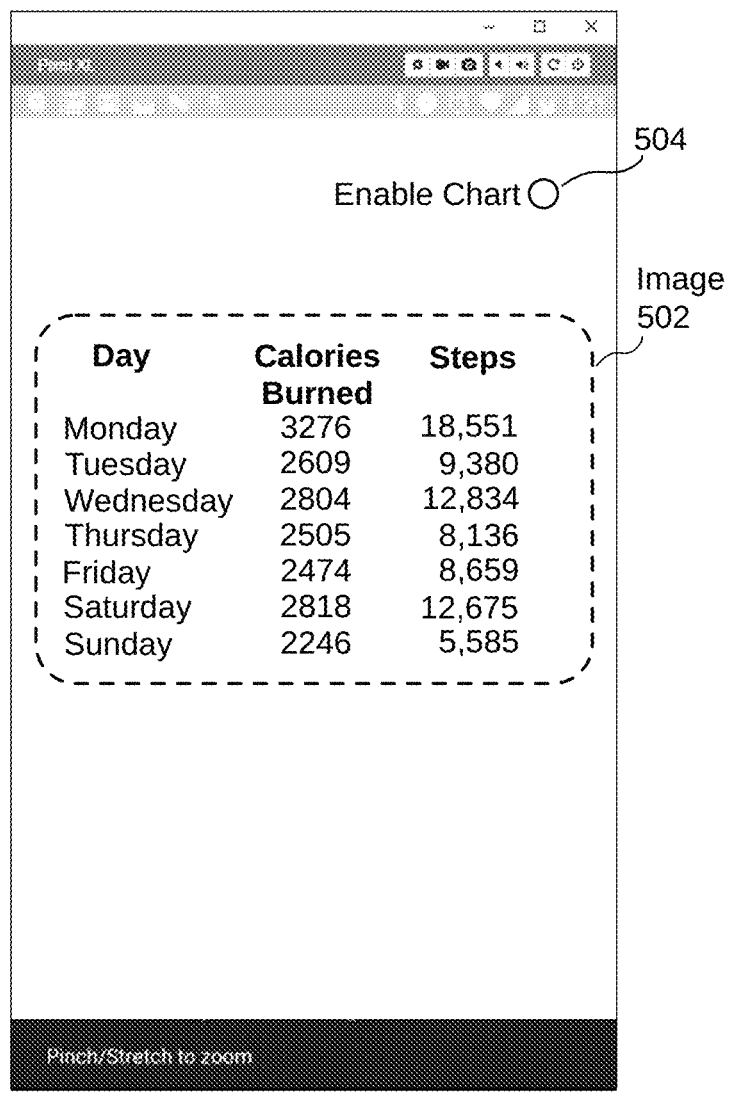
FIG. 5 illustrates an example UI displaying an image of text that is being captured by a camera, according to some implementations.

FIG. 5 illustrates an example UI 500 displaying an image 502 of text that is being captured by a camera, according to some implementations. As shown, the camera is capturing an image of text on an object. The object may be, for example, a piece of paper or other surface, etc. In various implementations, the camera captures raw pixel data. The system then displays image 502 of the text captured by the camera in UI 500.

In various implementations, the text includes alphanumeric characters. For example, the text may include letters (e.g., labels, etc.). The particular text on a given object may vary, depending on the particular scenario. For example, the text may represent nutrition information, bar code information, etc.

Also shown in UI 500 is a button 504. As described in more detail herein, in some implementations, when a user selects button 504, the system generates a graphical image or graph based on image 502.

Referring still to FIG. 4, at block 404, the system recognizes the text. In some implementations, the system recognizes the text by performing any suitable optical character recognition technique.

In various implementations, the system may determine from the recognized text and the positioning of the text in the image that the text is in a table format (e.g., tabular data). To recognize a table, the system may determine that some of the text are numbers or values, and may determine that some of the text includes letters (e.g., of a label or header). For example, in various implementations, the system may use OCR where a column starts, where a column ends, whether looking at letters or numbers, etc. In some implementations, the system may recognize non-alphanumeric objects such as people, landmarks, etc. In some implementations, the system may recognize mathematical symbols and may determine potentially associated or underlying mathematical formulas for the totals of different columns of values. The system may use such mathematical formulas for further processing or manipulation of the data.

At block 406, the system generates a data structure that includes the text. In various implementations, the data structure may be any suitable data structure that stores and organizes the data/text and any other associated data or metadata. In various implementations, the system may store the data structure in a suitable storage location (e.g., local cache 122 of client device 112, etc.). In various implementations, the system may organize the text in the data structure in a table. This enables the system to efficiently process the data in the data structure.

Implementations enable the system to manipulate data after being captured by the camera and recognized by the system. In various implementations, the graphical images as well as the underlying data used to generate the graphical images may be modified or manipulated. For example, words and numbers may be sorted, numbers may be used for calculations, etc. Such data may then be processed by any application associated with the system and/or to which the system may send the data.

At block 408, the system generates a graphical image that represents at least a portion of the text. For example, if the text includes one or more columns of numbers, the system may generate a graphical image or graph that pictorially represents the one or more columns of numbers. In some implementations, the graphical image may be a bar chart. In some implementations, the graphical image may be a pie chart. The particular type of graphical image may vary and will depend on the particular implementation.

At block 410, the system displays the graphical image in the UI in a display screen of a client device such as client device 112. In various implementations, because the system stores the data recognized from the image of text, the system can manipulate the data as needed to generate and display the graphical image.

Figure 6:
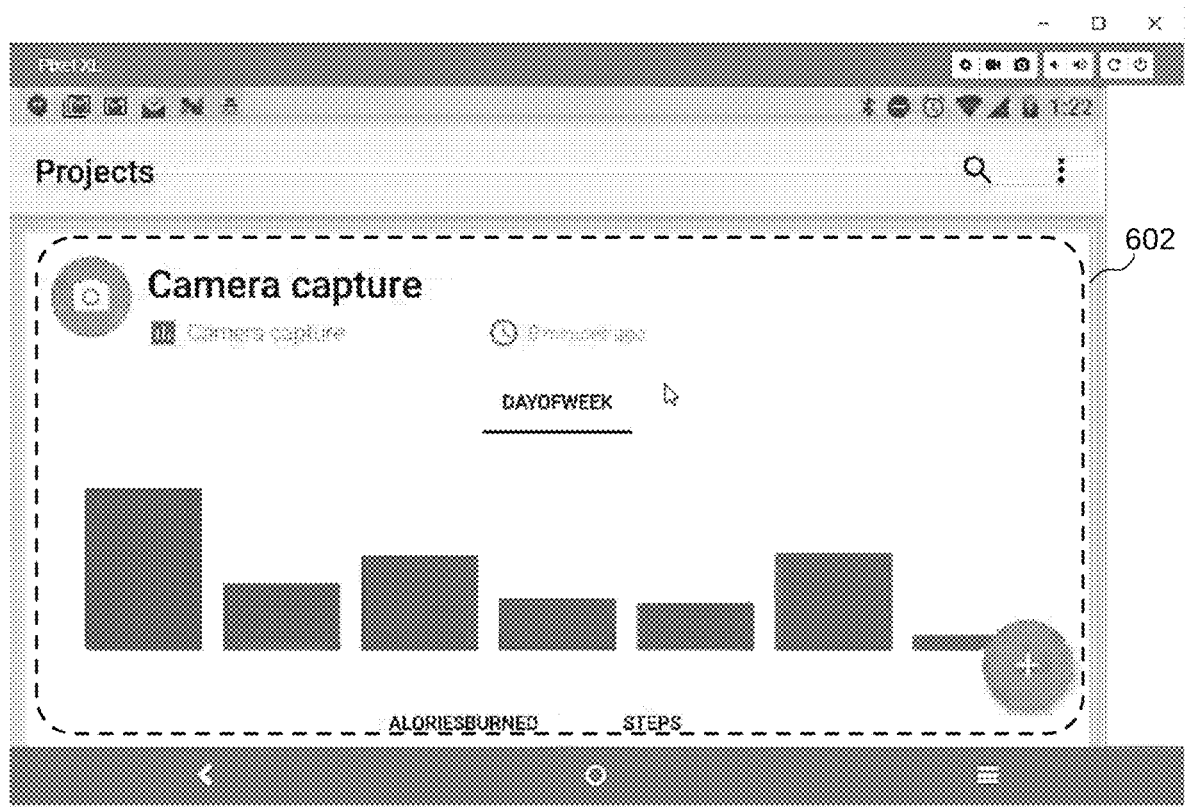
FIG. 6 illustrates an example UI displaying a graphical image that is being captured by a camera, according to some implementations.

FIG. 6 illustrates an example UI 600 displaying a graphical image 602 that is being captured by a camera, according to some implementations. As indicated herein, in various implementations, graphical image 602 may be generated and displayed when the user selects button 504 as shown in FIG. 5. In this particular example implementation, the graphical image is a bar chart.

In some implementations, if the user notices that any of the information in the graphical image is incorrect or needs to be changed, updated, etc., the system may enable the user to make such changes to the imported, underlying data.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all steps shown and/or may have other steps instead of, or in addition to, those shown herein.

Figure 7:
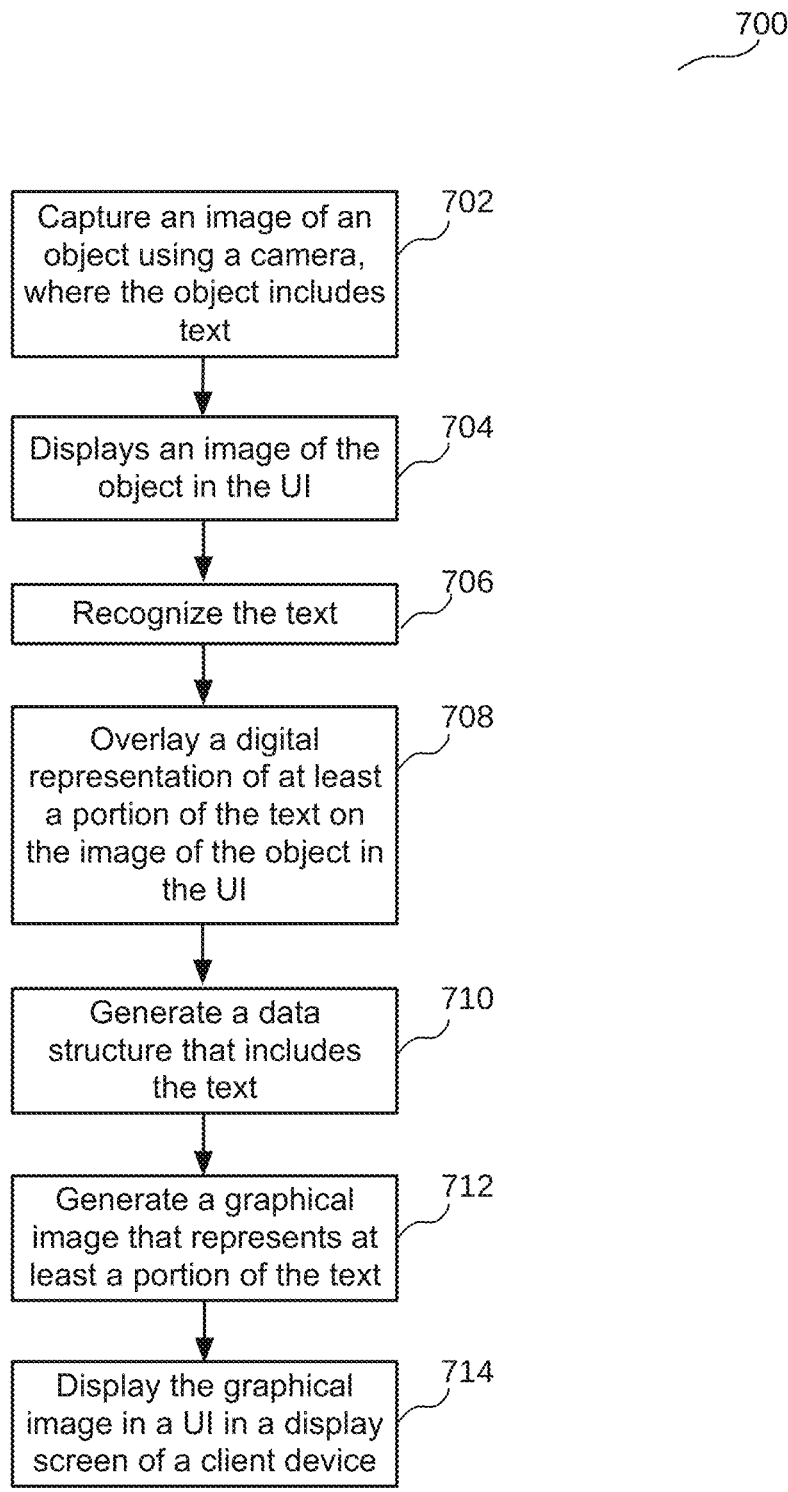
FIG. 7 illustrates an example flow diagram for importing and presenting data, according to some implementations.

FIG. 7 illustrates an example flow diagram 700 for importing and presenting data, according to some implementations. In various implementations, a method is initiated at block 702, where a system such as client device 112 captures an image of an object using a camera, where the object includes text. As indicated herein, the text may include alphanumeric characters. Also, the object may be any object in the real world. For example, the object may be a piece of paper, a wall, another display screen, etc., where the text is on the surface of the object.

At block 704, the system displays an image of the object in the UI in the display screen of the client device. For example, referring again to FIG. 5, UI 500 displays an image 502 of the text being captured.

At block 706, the system recognizes the text. As indicated herein, in some implementations, the system recognizes the text by performing any suitable optical character recognition technique. For example, in various implementations, the system may determine using OCR where a column starts, where a column ends, whether looking at letters or numbers, etc. In some implementations, the system may recognize non-alphanumeric objects such as people, landmarks, symbols, etc.

At block 708, the system overlays a digital representation of at least a portion of the text on the image of the object in the UI in the display screen of the client device as the text is being recognized. In various implementations, the digital representation of the text enables the user to visually see that the data captured and recognized by the client device matches the actual text that is physically on the object (e.g., text printed on a paper document).

Figure 8:
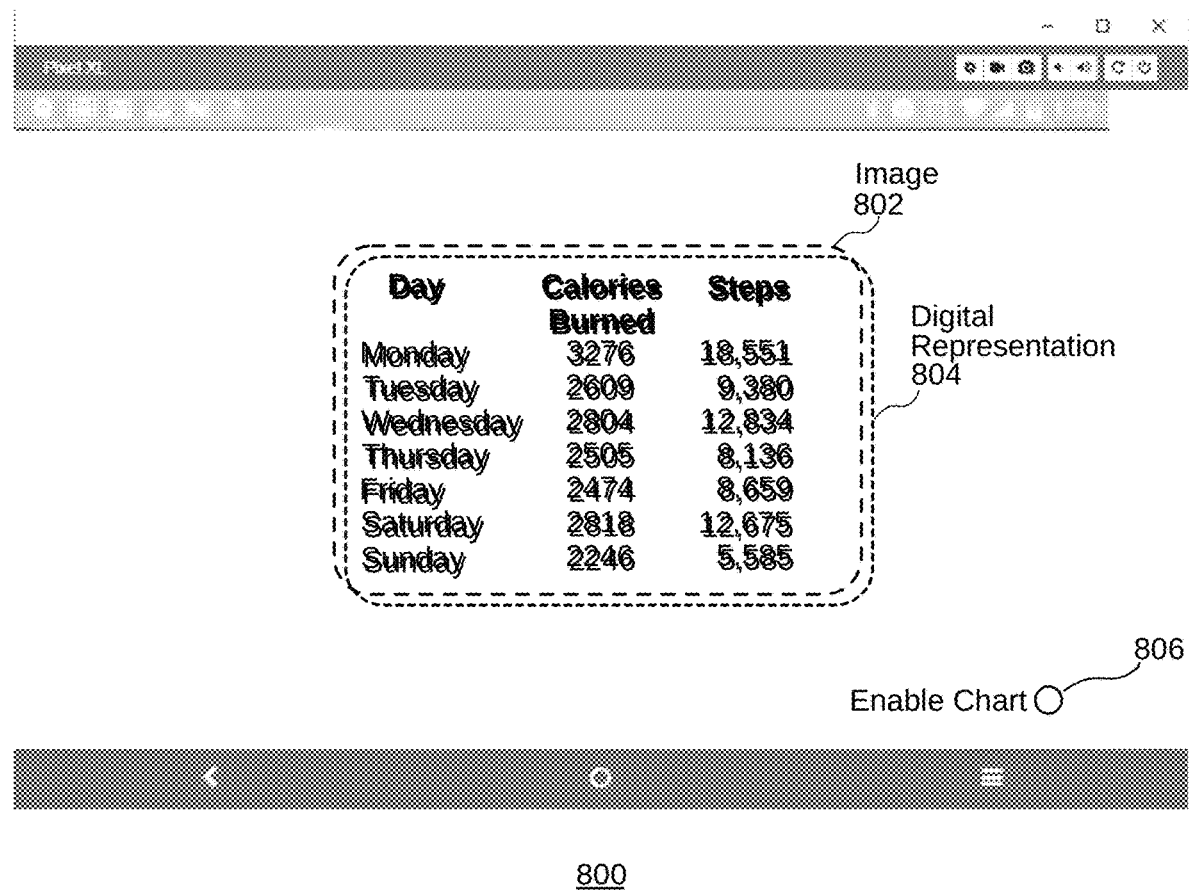
FIG. 8 illustrates an example UI displaying an image of text and a digital representation of the text in an image, according to some implementations.

FIG. 8 illustrates an example UI 800 displaying an image 802 of text and a digital representation 804 of the text in image 802, according to some implementations. In some implementations, UI 800 displays a digital representation (e.g., wireframe, table, etc.) of at least a portion of the text in image 802, where the portion of the text being displayed is the portion of the text being recognized.

As shown, as the text in image 802 is being recognized, the system displays a digital representation 804 of portions of the text in image 802 that is being recognized. For example, the system displays the recognized alphanumeric characters. In this particular example, the system recognizes and displays in real time a digital representation of all of the text that is physically on the object or surface being captured by the camera, and the text that the system recognizes.

As shown, the text in image 802 and the text of the digital representation 804 appear blurry, because the system overlays digital representation 804 of the text on top of the text in image 802 in real time. If the camera lens moves as the user is holding the camera or client device, the image 802 may move slightly such that text in image 802 and the text in digital representation 804 are not exactly aligned. The user still has immediate feedback on the recognition process.

In some implementations, if the system is still processing image 802 and has recognized a portion of the text, the system may display a digital representation of the portion of the text that is currently recognized, which provides the user with immediate feedback on the recognition process.

Also shown in UI 800 is a button 806. As described in more detail herein, in some implementations, when a user selects button 806, the system generates a graphical image or graph based on image 802, or more particularly, based on digital representation 804.

At block 710, the system generates a data structure that includes the text. As indicated herein, in various implementations, the data structure may be any suitable data structure that stores and organizes the data/text and any other associated data or metadata.

At block 712, the system generates a graphical image that represents at least a portion of the text. For example, if the text includes one or more columns of numbers, the system may generate a graphical image or graph that pictorially represents the one or more columns of numbers. For example, the graphical image may be a bar chart, a pie chart, etc. As indicated herein, in various implementations, the graphical image may vary and will depend on the particular implementation.

At block 714, the system displays the graphical image in a UI in a display screen of a client device.

Figure 9:
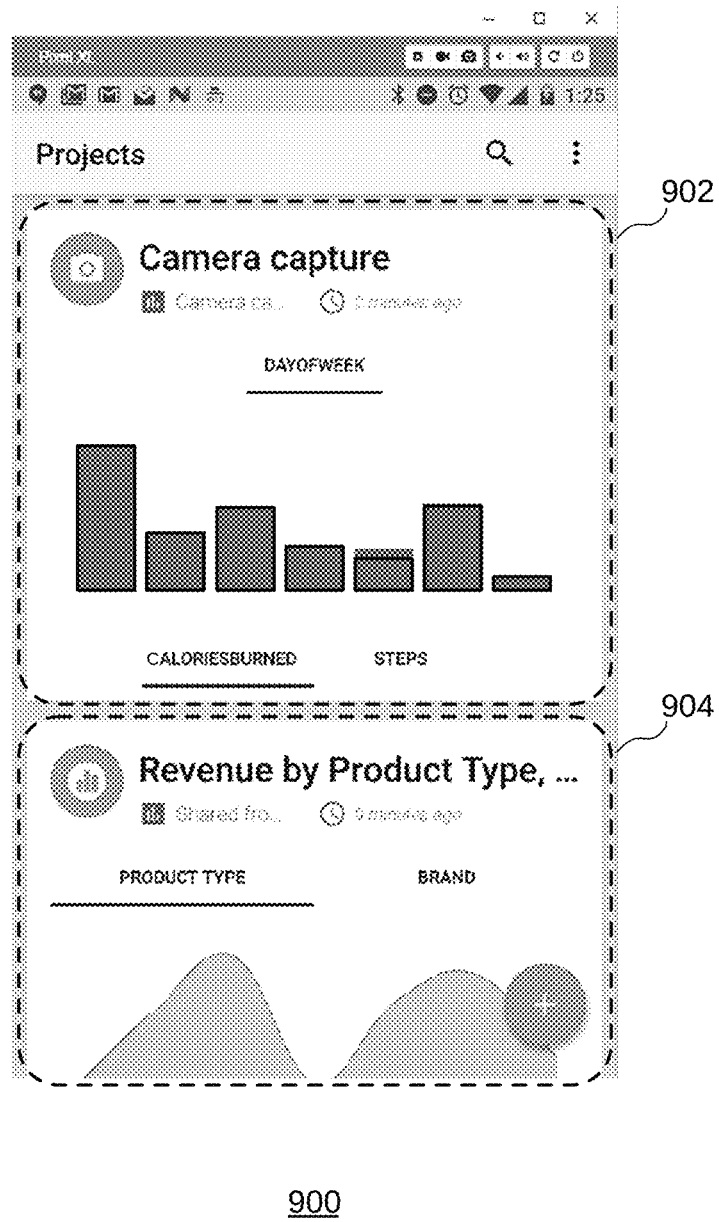
FIG. 9 illustrates an example UI displaying graphs, according to some implementations.

FIG. 9 illustrates an example UI 900 displaying graphs 902 and 904, according to some implementations. Graph 902 of FIG. 9 is a graphical image that represents the text in image 802, or more particularly, based on digital representation 804 of FIG. 8.

For clarity, graph 902 FIG. 9 differs from digital representation 804 of FIG. 8. in that graph 902 is a bar chart or graph that presents grouped data with rectangular bars or other shapes with sizes proportional to the values they represent, not necessarily the text itself. Digital representation 804 of text as described is a digital version of text. In some scenarios, a graphical image may include text. For example, in some implementations, a bar chart such as graph 902 of FIG. 9 may include labels (e.g., "Calories Burned," "Steps," etc.) or values (e.g., numbers) as a part of a chart or graph.

For example, as shown, the 7 bars represent 7 days of the week. As shown underneath the bars are text (e.g., calories burned and steps). In this particular example, the calories burned text/selection is selected (indicated by an underscore). As such, the length of each bar is proportional to the calories burned for the respective day. If the user were to select the steps text/selection, graph 902 would change such that the length of each bar is proportional to the number of steps for the respective day.

In some implementations, the system may display a recognition indication in the UI in the display screen of the client device. In some implementations, the recognition indication indicates when the text is recognized. For example, as shown, the recognition indication indicates that the camera captured the text, and indicates when the camera captured the text (e.g., 2 minutes ago, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all steps shown and/or may have other steps instead of, or in addition to, those shown herein.

Figure 10:
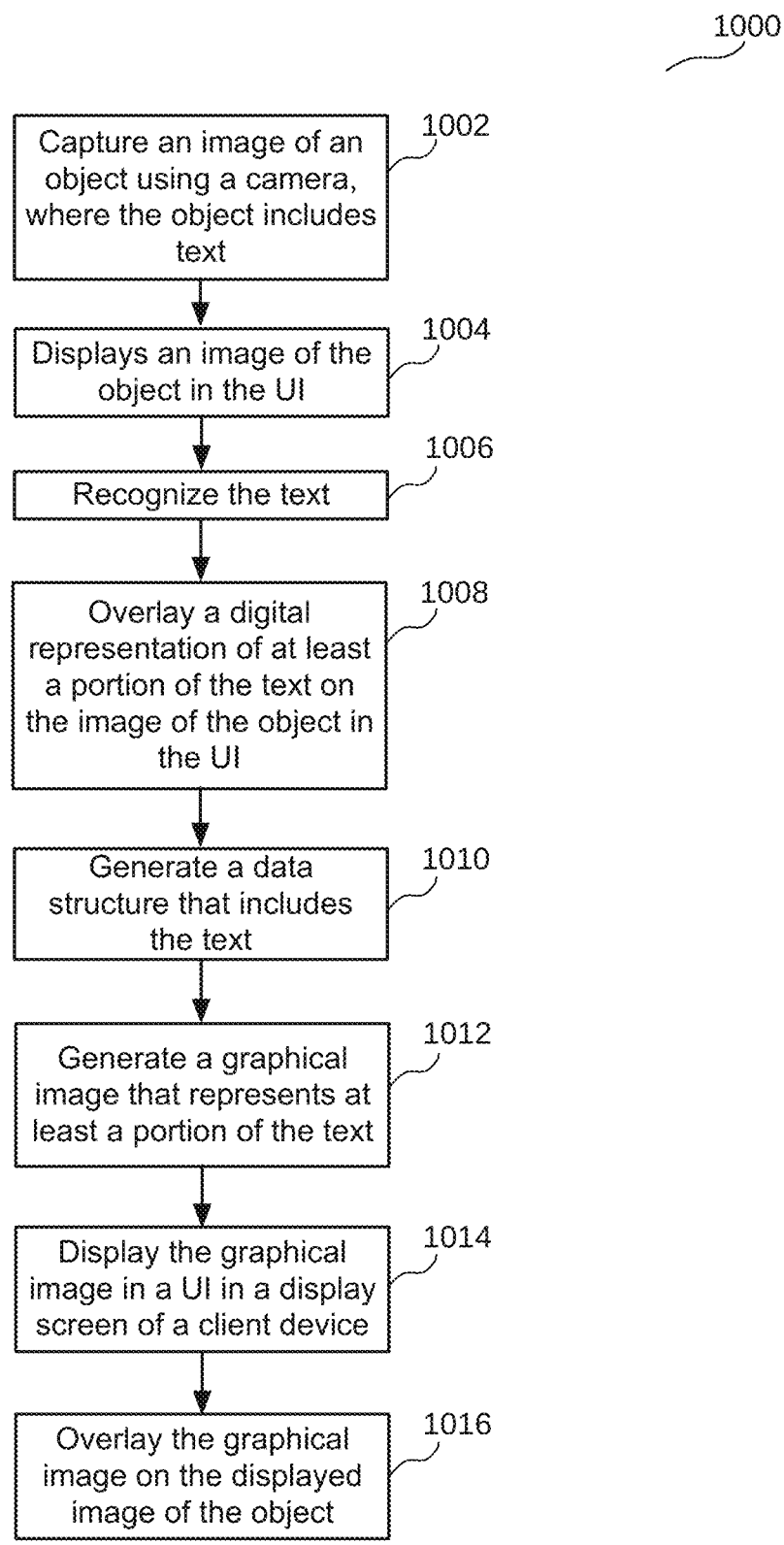
FIG. 10 illustrates an example flow diagram for importing and presenting data, according to some implementations.

FIG. 10 illustrates an example flow diagram 1000 for importing and presenting data, according to some implementations. In various implementations, a method is initiated at block 1002, where a system such as client device 112 captures an image of an object using a camera, where the object includes text. As indicated herein, the text may include alphanumeric characters.

At block 1004, the system displays an image of the object in the UI in the display screen of the client device. For example, referring again to FIG. 5, example screen shot 500 shows an image of the object being captured.

At block 1006, the system recognizes the text. As indicated herein, in some implementations, the system recognizes the text by performing any suitable optical character recognition technique. For example, in various implementations, the system may determine using OCR where a column starts, where a column ends, whether looking at letters or numbers, etc. In some implementations, the system may recognize non-alphanumeric objects such as people, landmarks, symbols, etc.

At block 1008, the system overlays a digital representation of at least a portion of the text on the image of the object in the UI in the display screen of the client device as the text is being recognized. Referring again to FIG. 8, example screen shot 800 shows an image of a digital representation of at least a portion of the text on the image of the object in the UI. As indicated above, in various implementations, the digital representation of the text enables the user to visually see if the data captured and recognized by the client device matches the actual text that is physically on the object (e.g., text printed on a paper document).

At block 1010, the system generates a data structure that includes the text. As indicated herein, in various implementations, the data structure may be any suitable data structure that stores and organizes the data/text and any other associated data or metadata.

At block 1012, the system generates a graphical image that represents at least a portion of the text. For example, if the text includes one or more columns of numbers, the system may generate a graphical image or graph that pictorially represents the one or more columns of numbers. For example, the graphical image may be a bar chart, a pie chart, etc. As indicated herein, in various implementations, the graphical image may vary and will depend on the particular implementation.

At block 1014, the system displays the graphical image in a user interface (UI) in a display screen of a client device.

At block 1016, the system overlays the graphical image on the displayed image of the object. As indicated herein, in some implementations, if the user notices that any of the information in the graphical image is incorrect or needs to be changed, updated, etc., the system may enable the user to make such changes to the imported, underlying data.

Figure 11:
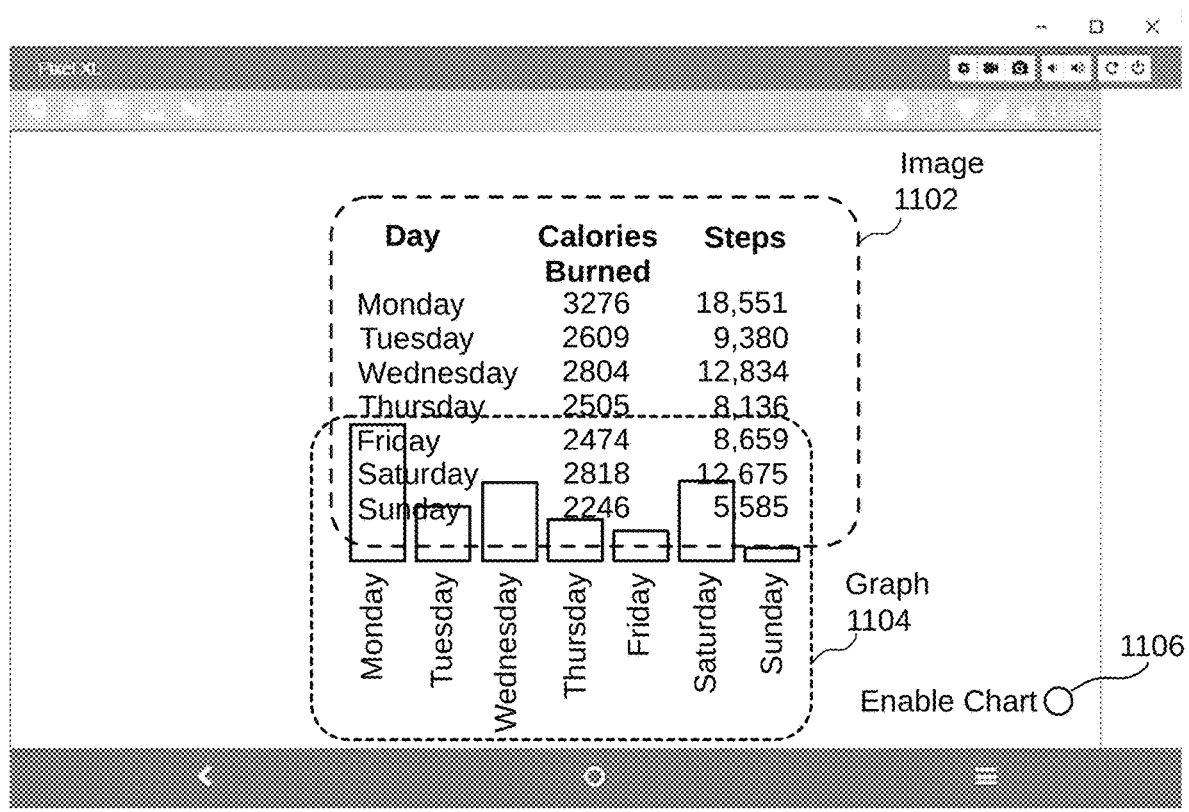
FIG. 11 illustrates an example UI displaying an image of text and a graph of the text, according to some implementations.

FIG. 11 illustrates an example UI displaying an image 1102 of text and a graph 1104 of the text in image 1102, according to some implementations. As shown, a camera on the client device is capturing image 1102 that contains text. The text may be on the surface of an object. The object may be a piece of paper, another display screen, etc. Also shown is graph 1104, which the system may display when the user selects button 1106 to enable graph 1104 to be displayed.

In various implementations, the system overlays graph 1104 on top of image 1102. The overlay enables a user to see, on the display screen of the client device, both the text on the surface of the object being captured and the overlaid "virtual" graph (e.g., bar chart, pie chart, etc.). As such, in some scenarios, if two different people are looking directly at the same text on a surface, one person may have an additional graphical view on his or her client device (e.g., phone, etc.). The other person without the client device would see the text on the actual surface of the object. As such, implementations provide the user viewing the text through the viewfinder with an analytics-based augmented reality (AR) experience, where useful information such as a graph is overlaid on top of the image being captured. The precise position of graph 1104 relative to image 1102 may vary depending on the particular implementation. In some implementations, if there is sufficient room on the display screen, the system positions graph 1104 so as not to cover or obscure image 1102.

As shown, the 7 bars represent 7 days of the week, where the length of each bar is proportional to the calories burned for the respective day. In some implementations, the system may provide the user with graph options. For example, in some implementations, the system may also show bars, where the length of each bar is proportional to the number of steps for the respective day.

Figure 12:
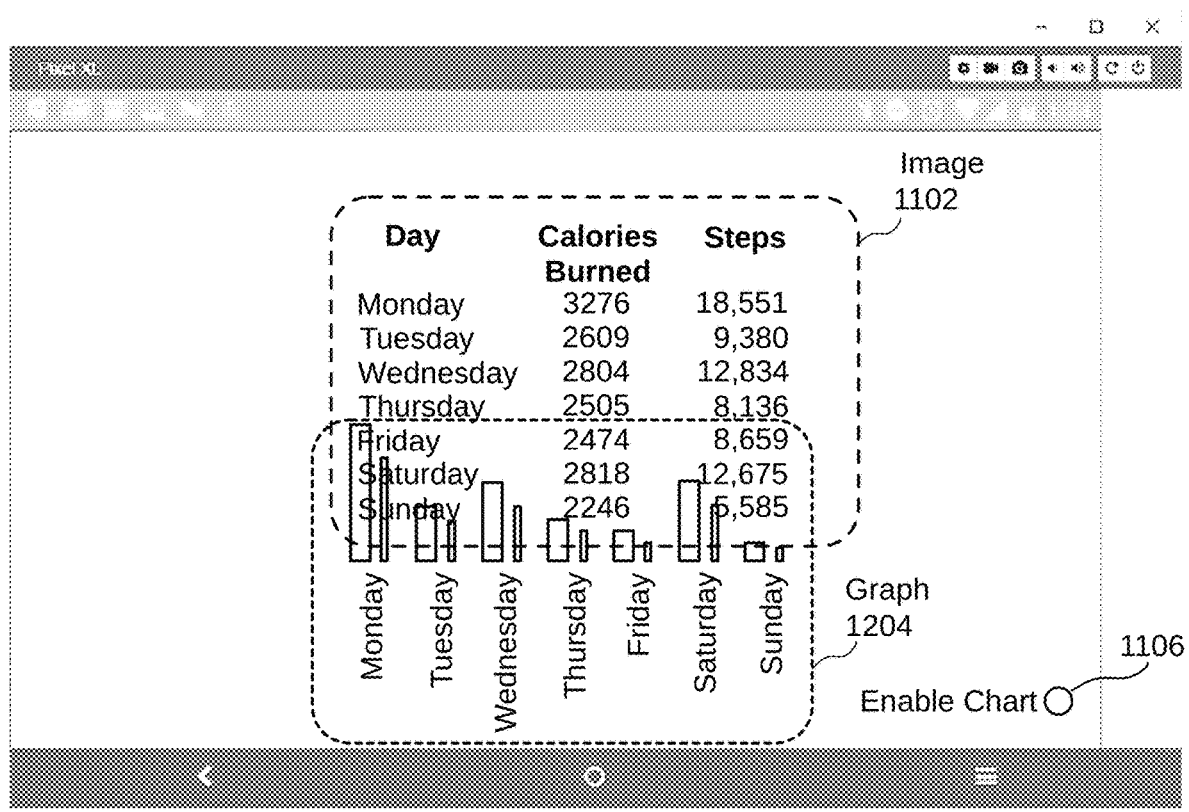
FIG. 12 illustrates an example UI displaying an image of text and a graph of the text, according to some implementations.

FIG. 12 illustrates an example UI 1100 displaying image 1102 of text and a graph 1204 of the text in image 1102, according to some implementations. As shown, the camera on the client device is capturing image 1102 that contains text. Also shown is graph 1204, which the system may display when the user selects button 1106 to enable graph 1104 to be displayed. In this particular implementation, the system displays multiple sets of bars for the calories burned and for the number of steps in UI 1200. In various implementations, multiple sets of bars in a graph may be distinguished in various ways (e.g., width, color coding, etc.).

As indicated herein, in some implementations, if the user notices that any of the information in the graphical image is incorrect or needs to be changed, updated, etc., the system may enable the user to make such changes to the imported, underlying data. In some implementations, the system may enable the user to add other information relative to a given graphical image. For example, the system may enable the user to add a legend or other labels.

While some implementations are described in the context of bar graphs, other types of graphical images are possible, depending on the particular implementation. For example, system may display a pie chart over the image.

Figure 13:
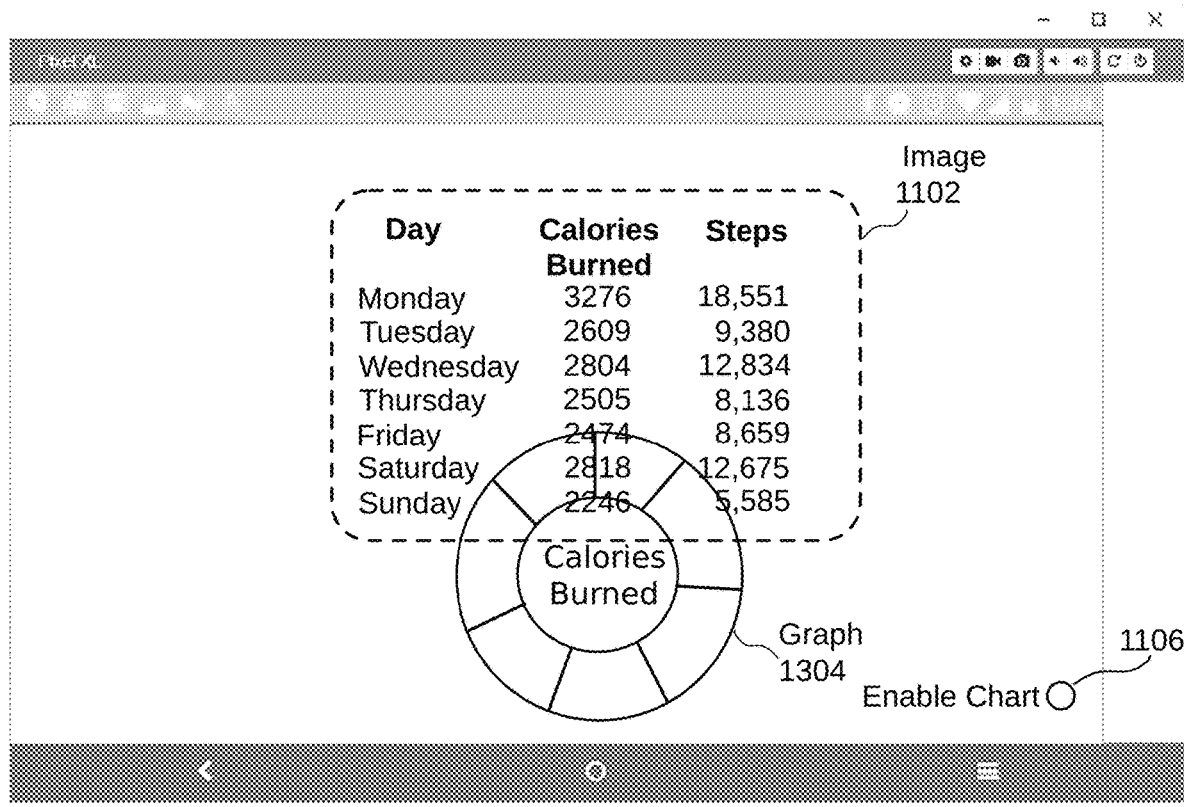
FIG. 13 illustrates an example UI displaying an image of text and a graph of the text, according to some implementations.

FIG. 13 illustrates an example UI 1100 displaying image 1102 of text and a graph 1304 of the text in image 1102, according to some implementations. As shown, the camera on the client device is capturing image 1102 that contains text. Also shown is graph 1304, which the system may display when the user selects button 1106 to enable graph 1104 to be displayed. In this particular implementation, the system displays a simplified pie chart having multiple sections with sizes proportional to the calories burned on respective days.

For illustrative purposes, a pie chart having sections representing calories burned are shown. In some implementations, a pie chart may have sections representing the number of steps, or may have sets of sections representing calories burned and the number of steps. While some example implementations are described herein in the context of calories burned and number of steps, these implementations and other may also apply to other categories of information.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all steps shown and/or may have other steps instead of, or in addition to, those shown herein.

Implementations described herein provide various benefits. For example, implementations enable and facilitate convenient transfer of information from one application to another application. Implementations also avoid the need for "intents," which normally would call for the user to select a piece of content they wish to open. As such, implementations avoid the need for a user to select applications from a list (e.g., in order to open an attached PDF in an email application). Implementations also enable a user to manipulate data captured by a camera.

Figure 14:
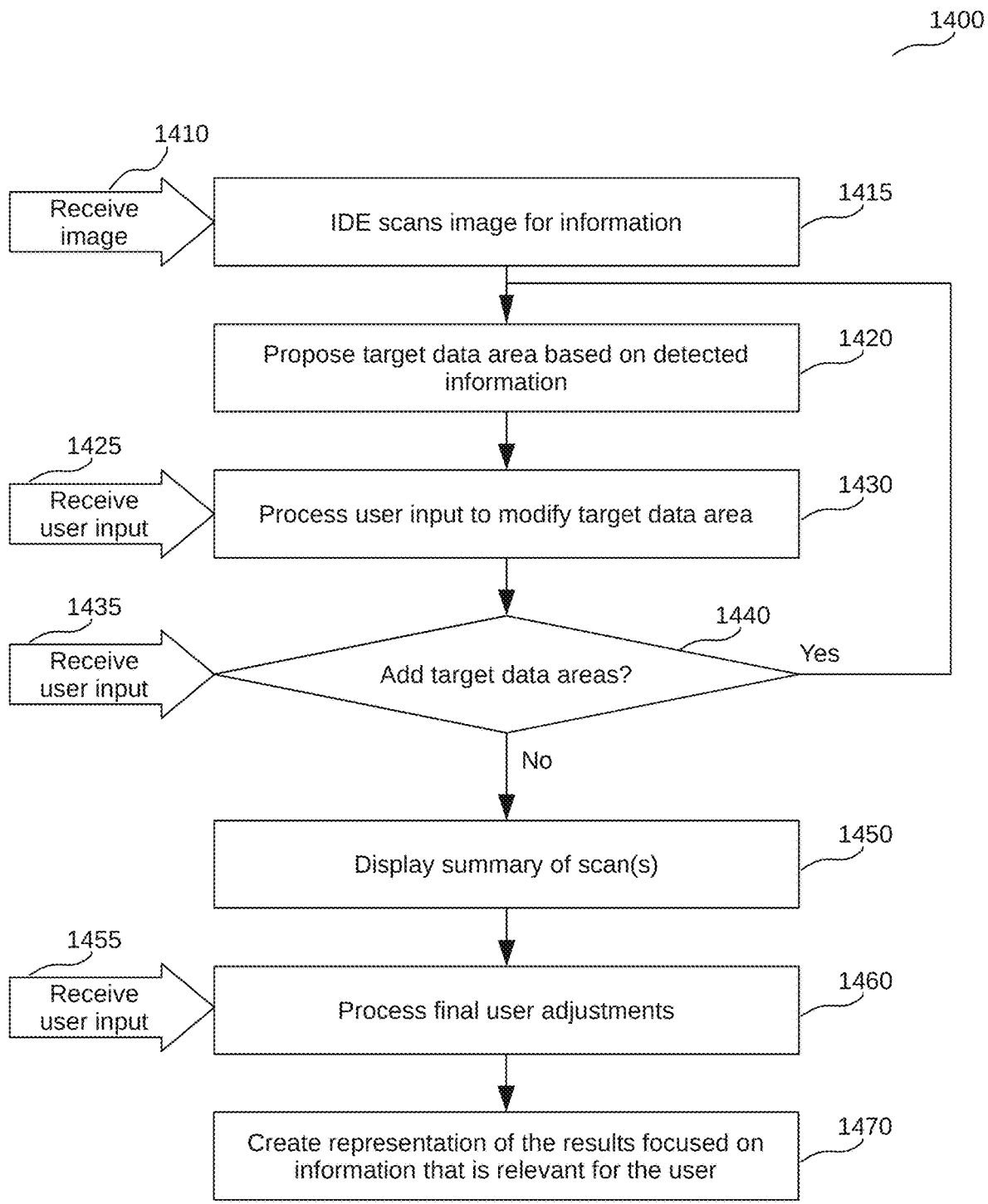
FIG. 14 illustrates a method for interactively assisting a user to import data, according to some implementations.

FIG. 14 illustrates a method 1400 for interactively assisting a user to import data according to some implementations. Method 1400 is performed by a computing system and comprises the following steps.

Step 1410—Receiving an image from the user. The user may capture or import the image, or retrieve it from stored images. In a typical situation, a user may point a cell phone camera at an object that contains information relevant to her or him, and view the image or snap a photo. The object may, for example, be a sheet of paper that shows a table, a graph, an icon, or any other relevant data. The computing system receives the image.

Step 1415—Using an information detection engine (IDE), scanning the image for information. The IDE may be or include an optical character recognition (OCR) engine that may be enhanced with a trained or self-learning artificial intelligence (AI) unit. Some implementations include the IDE as a software program executed on a programmable processor, whereas other implementations include the IDE as a dedicated hardware module, such as a neuromorphic processor or other processor that performs pattern recognition techniques using multiple parallel operations to analyze the image and detect the information. Yet other implementations may include the IDE as a combination of dedicated hardware and software or firmware running on a programmable processor. The IDE may scan the image, for example, for a table, or for data in tabular form, and it may ignore ancillary characters. Or it may scan the image for a graph, such as a bar graph, a pie chart, or any other data visualization format, and analyze the information in it. Some of the information may be in text format (such as in a table, or legends with a pie or bar chart), and some information may be visual, such as the size of bars (length, width, area) or of pie sections (area). Some information may be independent of color or shading, whereas other information, such as the coding of pie sections in a pie chart, may be conveyed through color coding and/or shading. Many types of data visualization formats exist, each with its own methods of visually conveying relevant data, and the IDE may be configured for analyzing the data in any number of visualization formats and types. The IDE may analyze the image sequentially, or in parallel.

Step 1420—Proposing a target data area based on the detected information. The user may (in Step 1410), have presented the computing system with an image that captures more of the object than just the area that carries the required information. Since the rest of the object may be irrelevant, it may not be necessary to keep its data. Thus, parts of the image could be cropped. However, since the user determines what is relevant, the computer system proposes the target data area to the user instead of independently cropping the image to a smaller area. In an implementation, the computing system may display the object on a screen to the user, and draw a box or outline around the proposed target data area. The box or outline may include handles, allowing the user to modify its size, position, orientation, and/or shape.

Step 1425—Receiving user input for modifying the target data area. For example, the computing system may receive modified positions of box or outline handles, indicating size, position, orientation, and/or shape modifications required by the user.

Step 1430—Processing the user input received in Step 1425 by modifying the target data area in accordance with the received user input.

Step 1435—Receiving user input indicating whether additional target areas must be added.

Step 1440—Upon determining, from the user input in Step 1435, that further target areas must be added, repeating Step 1410 through Step 1440.

Step 1450—Upon determining, from the user input in Step 1435, that no further target areas need to be added, displaying a summary of the modified target data areas on a screen for the user, and prompting the user to indicate any final adjustments that must be made.

Step 1455—Receiving user input with information about any final adjustments to be made. For example, the user may decide to drop one or more parts of the target data areas, or modify one's size, position, and/or shape, or change their order or priority. Alternatively, the user may correct any texts that were misinterpreted. Or the user may indicate that no further changes are required.

Step 1460—Processing the target data areas to incorporate any final adjustments received in Step 1455, and interpreting the information in the target data areas to produce interpretation results. The implementation may interpret the target data areas as described throughout the present document, for example as described with reference to FIG. 10, and upload the interpretation results to any facility of the user's choosing, for example a cloud-based data store. The implementation may also retain the interpretation results locally for any immediate or future use.

Step 1470—Creating a representation of the results, for example in a data visualization that has the same or a different format from the original representation shown on the object. The data visualization may be or include a graph, a table, a multidimensional spreadsheet, or any other form of graphical representation that emphasizes information that is relevant to the user while suppressing other information that is irrelevant to the user. The implementation may show the representation of the results along with, or independent of, the object. The implementation may overlay the representation of the results along with a full or partial image of the object, for example as shown in FIG. 12, and display both to the user.

FIG. 15 illustrates an image 1500 of an object with text paragraphs and tabular data that may be detected by implementations described herein. Image 1500 includes areas identified as a paragraph 1510, areas identified as a column 1530, and a set of columns identified as a table 1520. Table 1520 occupies an area bounded by its left side 1521, it top 1522, its right side 1523, and its bottom 1524. As is apparent on inspection, a paragraph 1510 is a text block that may have a wide aspect ratio, and that may have a relatively large width compared to the total width of image 1500. A paragraph 1510 typically includes one or more lines of text, which may be aligned on the right side, the left side, both the right and the left sides, or in the center. A line of text may include one or more adjacent words that are vertically aligned. Words may be horizontally separated with usually equal distances within one line, or with usually equal distances within the whole paragraph. Also apparent on inspection is that a table follows a different layout. Each column usually has some form of alignment (left, right, center, or justified), but a column is a text block with a narrow aspect ratio, or at least with a width that is relatively small versus the width of a paragraph. Within a column, alignment may vary. For example, a column header may be differently aligned than the data beneath it. Or within a column, numbers may be right-aligned while text is left-aligned. Implementations may use these characteristics to confirm the text block as a column. In FIG. 15, areas identified as paragraph 1510 are shown in a boundary drawn with a thin dashed line, areas identified as column 1530 are shown in a boundary drawn with a thick dashed line, and the group of columns identified as table 1520 is shown in a boundary drawn with a solid line.

Figure 16:
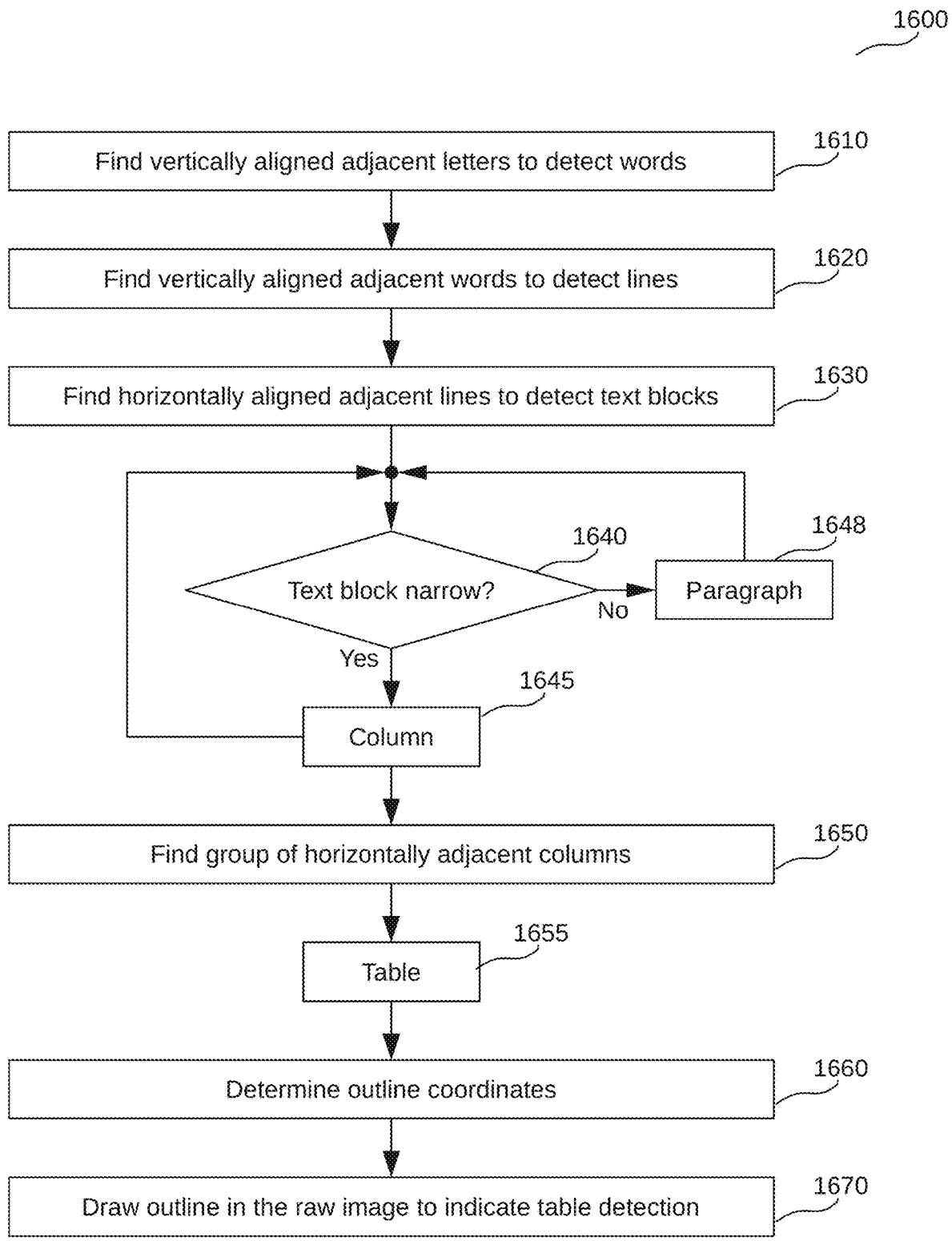
FIG. 16 illustrates a method for detection of a table in a raw image performed by an IDE according to some implementations.

FIG. 16 illustrates a method 1600 for detection of a table in a raw image performed by an IDE according to some implementations. Method 1600 comprises the following steps.

Step 1610—Finding vertically aligned adjacent characters to detect words. A word ends when a space follows that is wider than letters surrounding it. Vertical alignment may be on the most common bottom (typographically the baseline) and the most common top (typographically the x-height above the baseline) of letters, where known letters (such as g, j, p, q, and y) extend below the baseline and other known letters (such as capitals, b, d, f, h, k, l, and t) extend above the x-height. In this context, "characters" includes letters, digits, symbols, emoji, and characters known in any alphabet or any non-alphabetic writing system, including letter arrangements in Hangeul and Chinese characters, and generally any items captured in, for example, Unicode.

Step 1620—Finding vertically aligned adjacent words to detect text lines. Vertically aligned words share the same baseline and x-height.

Step 1630—Finding horizontally aligned adjacent text lines to detect one or more text blocks. Text lines may be right-aligned, left-aligned, centered, and/or justified. In general, adjacent lines within a text block may be roughly equidistant, or the distance may occasionally deviate from an average vertical distance when some letters or words are enlarged, or when subscripts or superscripts require extra whitespace.

Step 1640—Determining if a text block is narrow. The implementation may determine that the text block is narrow if its width is smaller than its length. Some implementations may determine that a text block is not narrow, despite its width being smaller than its length, if the text block's width spans the full width of the page's (or object's) text area (determined as the boundary of a rectangular area outside of which no letters appear), or if the full width of the page's or object's text area is taken up by the text block and, for example, a photograph or drawing.

Step 1645—Upon determining that the aspect ratio of the text block is narrow, further handling the text block as a column. Taking a next text block and proceeding with Step 1640. If there are no more text blocks, proceeding with Step 1650.

Step 1648—Upon determining that the aspect ratio of the text block is not narrow, further handling the text block as a paragraph. Taking a next text block and proceeding with Step 1640. If there are no more text blocks, proceeding with Step 1650.

Step 1650—Finding a group of horizontally adjacent columns, i.e. a group of columns whose tops have approximately the same vertical position, whose bottoms have approximately the same vertical position, and that are positioned next to each other without other areas in between.

Step 1655—Upon finding the group, further handling it as a table. Proceeding with Step 1650 to find more groups. When there are no more groups to find, proceeding with Step 1660.

Step 1660—Of a table, determining coordinates for an outline. An outline may be a rectangle with a left side, a top, a right side, and a bottom, or it may be any other closed shape, such as a polygon.

Step 1670—Based on the coordinates, drawing the outline in the raw image to indicate table detection. Some implementations may, instead of drawing the outline, overlay the raw image with the outline or another indication that the table has been detected.

Whereas method 1600 could be characterized as heuristic, implementations may use other methods for detecting paragraphs, tables, and other information. For example, some implementations may use statistical analysis on placement of letters to distinguish tables and paragraphs. Other methods may perform an image analysis, for example by taking a digital Fourier transform (DFT) of the image, and separating areas with distinct spectral fingerprints.

Figure 17:
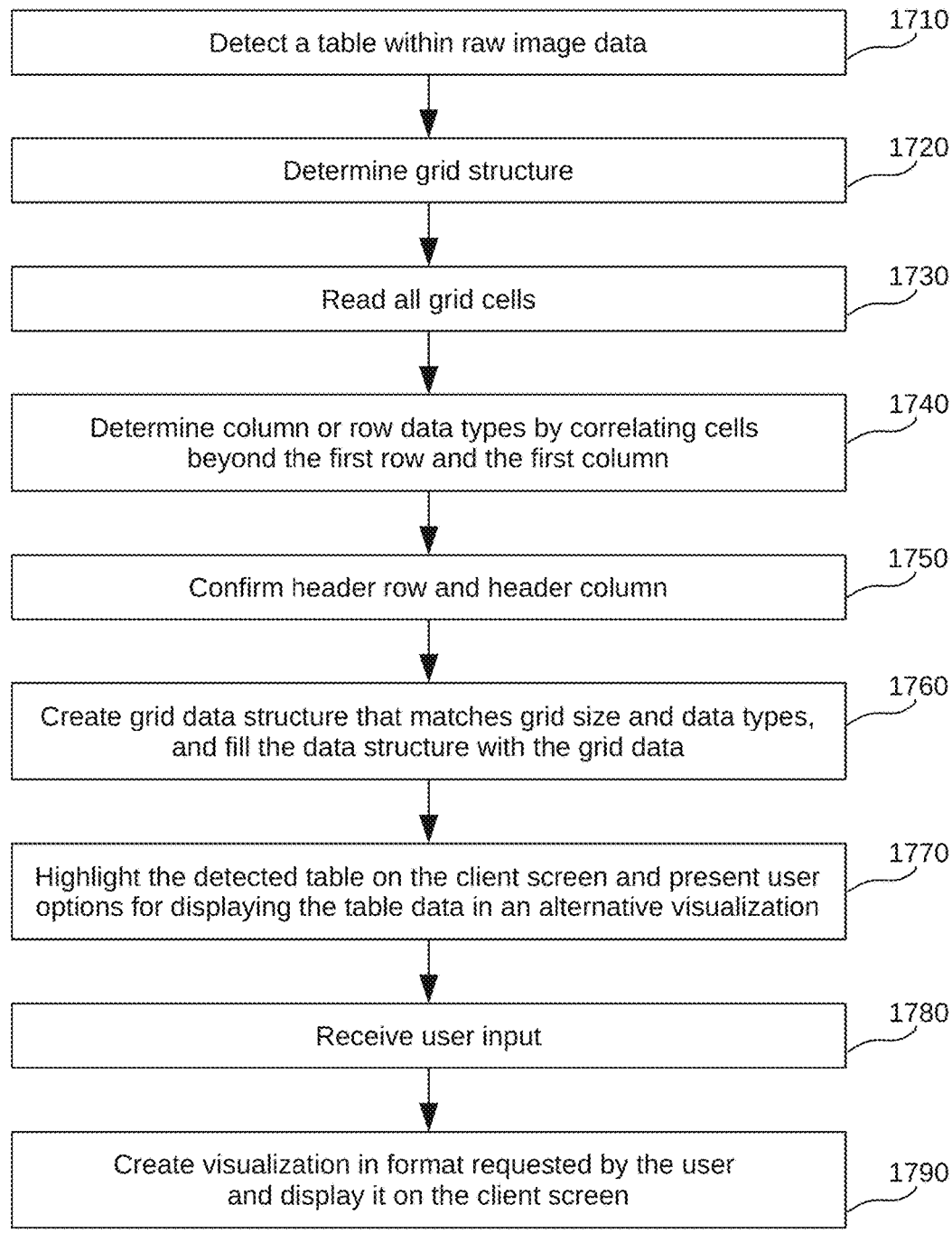
FIG. 17 illustrates a method of overlaying raw image data on a client display screen with a graphical representation of recognized data according to an implementation of the invention.

FIG. 17 illustrates a method 1700 of overlaying a raw image on a client display screen with a data visualization representing recognized data according to an implementation of the invention. Method 1700 includes the following steps.

Step 1710—Detecting a table within the raw image. The implementation may use, for example, part or all of method 1600 to detect the table.

Step 1720—In the table, determining a grid structure with grid cells arranged in columns and rows. For example, an implementation may determine if (and where) the table includes inner vertical and/or horizontal border lines, or if (and where) words, text lines, or small text blocks in individual columns are vertically aligned with words, text lines, or small text blocks within adjacent columns.

Step 1730—Reading data of all grid cells into a data structure with a provisional data type. For example, since recognized data comes in the form of characters, the provisional data type may be "text". In this context, "characters" includes letters, digits, symbols, emoji, and characters known in any alphabet or any non-alphabetic writing system, including letter arrangements in Hangeul and Chinese characters, and generally any items captured in, for example, Unicode.

Step 1740—Determining final data types for grid cells. An implementation may determine if a majority of grid cells within a column can be characterized by a candidate first final data type. Likewise, the implementation may determine if a majority of grid cells within a row can be characterized by a candidate second final data type. If there is no majority or a small majority (near 50%) within most rows, and there are large majorities (near 100%) within most columns, then it is likely that the table has vertically consistent candidate first final data types, and the implementation may make the candidate first final data type the final data type within a column, for grid cells whose contents are compatible with the candidate first final data type. If however there is no majority or a small majority (near 50%) within most columns, and there are large majorities (near 100%) within most rows, then it is likely that the table has horizontally consistent candidate second final data types, and the implementation may make the candidate second final data type the final data type within a row, for grid cells whose contents are compatible with the candidate second final data type. An implementation may skip the first row and the first column (or handle them separately from the remaining grid cells), since these may represent headers that have data types different than the grid cells they head. An implementation ignores empty grid cells. Final data types may include text, date, number, Boolean, currency, and any other data type commonly found in tables, spreadsheets, and databases.

Step 1750—Confirming whether grid cells in the first row include column headers by determining if the grid cells in the first row have matching or repeating data types that are different from data types of grid cells in subsequent rows. Likewise, confirming whether grid cells in the first column include row headers by determining if the grid cells in the first column have matching or repeating data types that are different from data types of grid cells in subsequent columns. An example is apparent in FIG. 15, where table 1520 has column headers. The five column headers span the first row of table 1520, and their data type may be (respectively) ("text", "text", "text", "text", "text"). The first data row (and subsequent rows) has the following data types for the columns: "text" (Government, etc.), "text" (Canada, etc.), "number" (16,000, etc.), "currency" ($15.20, etc.) and "currency" ($90.00, etc.). Within ("text", "text", "text", "text", "text"), there is great consistency, however it matches poorly with ("text", "text", "number", "currency", "currency"). Therefore, an implementation may confirm that the first row contains column headers. Another indicator is that the first row is in bold typeface, whereas the remainder of the table uses a regular typeface. Table 1520 has data types that are consistent in each column, apart from the headers, but it does not have data types that are consistent in each row. Thus, an implementation cannot use that information to decide if the first column contains row headers. However, since column headers are shown in bold typeface, an implementation may expect that row headers would also be typographically different from the rows they're heading. In absence of such difference, and any difference in color coding or other presentational aspects, the implementation decides that the first column contains data rather than headers. Some embodiments may further obtain user feedback to confirm or change header designations.

Step 1760—Creating a data structure with the final data types determined in Step 1740 and headers determined in Step 1750 and filling it with the grid cell data converted to the final data types to become recognized data. Some implementations may skip this step, or provide automatic typing, or store the final data types separately from the data structure that holds the data using the provisional data types.

Step 1770—Highlighting or otherwise emphasizing the table in the raw image on the client display screen and presenting the user with options for displaying the recognized data in a requested data visualization. For example, an implementation may highlight the table by displaying a colored polygon around the table's boundary, or the implementation may overlay the table's raw image with text representing the recognized data. Data visualizations may include any data visualizations that represent data in a graphical way, highlighting some aspects of the data that are deemed of interest to the user and de-emphasizing or hiding aspects of the data that are not relevant to the user. Examples of such data visualizations are line charts, bar charts, pie charts, scatter plots, maps, Gantt charts, heat maps, timelines, tree maps, etc.

Step 1780—Receiving user input requesting display of the recognized data in a requested data visualization.

Step 1790—Creating the requested data visualization and displaying it on the client display screen overlaying the raw image at the location of the emphasized table.

Figure 18:
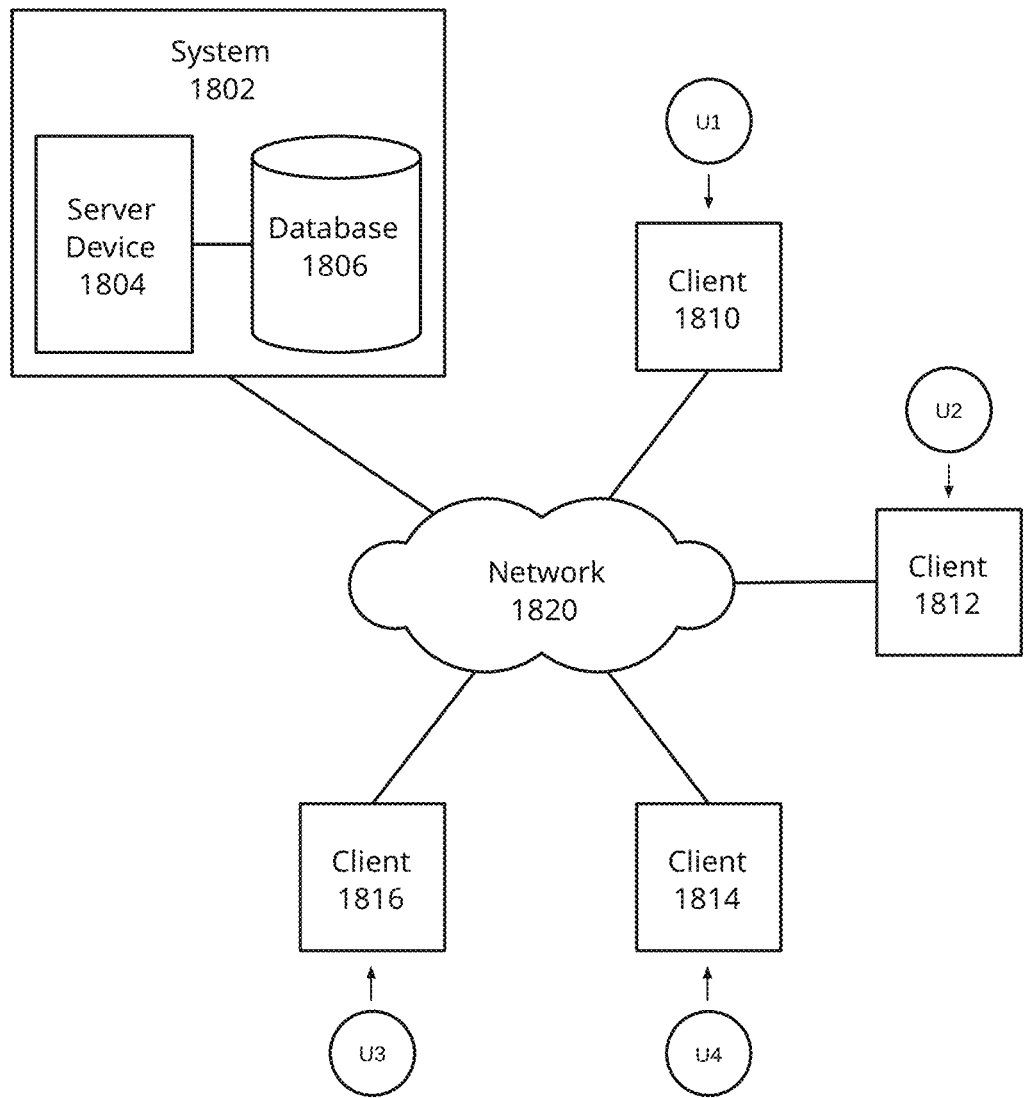
FIG. 18 illustrates a block diagram of an example network environment, which may be used for implementations described herein.

FIG. 18 illustrates a block diagram of an example network environment 1800, which may be used for implementations described herein. In some implementations, network environment 1800 includes a system 1802, which includes a server device 1804 and a network database 1806. Network environment 1800 also includes client device 1810, client device 1812, client device 1814, and client device 1816, which may communicate with each other directly or via system 1802. Network environment 1800 also includes a network 1820.

Implementations described herein may be implemented by a client device such as client device 1810, client device 1812, client device 1814, and/or client device 1816, or may be implemented by client device 1810, client device 1812, client device 1814, and/or client device 1816 in combination with system 1802. In some implementations, client device 1810, client device 1812, client device 1814, and/or client device 1816 communicate with system 1802.

For ease of illustration, FIG. 18 shows one block for each of system 1802, server device 1804, and network database 1806, and shows four blocks for client device 1810, client device 1812, client device 1814, and client device 1816. Blocks 1502, 1504, and 1506 may represent multiple systems, server devices, and network databases. Also, there may be any number of client devices. In other implementations, network environment 1800 may not have all components shown and/or may have other elements including other types of elements instead of, or in addition to, those shown herein. In various implementations, users U1, U2, U3, and U4 may view various information using respective client device 1810, client device 1812, client device 1814, and client device 1816.

While system 1802 of FIG. 18 is described as performing the implementations described herein, any suitable component or combination of components of system 1802 or any suitable processor or processors associated with system 1802 may perform the implementations described.

Figure 19:
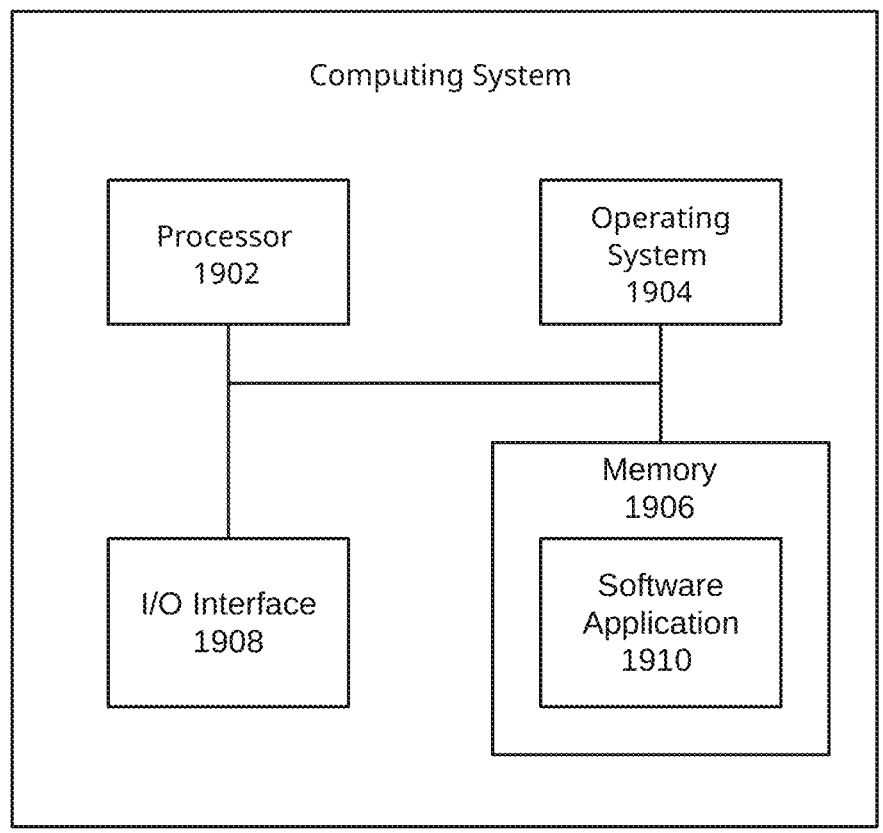
FIG. 19 illustrates a block diagram of an example computing system, which may be used for some implementations described herein.

FIG. 19 illustrates a block diagram of an example computing system 1900, which may be used for some implementations described herein. For example, computing system 1900 may be used to implement user client device 112 and/or BI server system 114 of FIG. 1. Computing system 1900 may also be used to implement system 1802 and/or any of client device 1810, client device 1812, client device 1814, and client device 1816 of FIG. 18, as well as to perform implementations described herein. In some implementations, computing system 1900 may include a processor 1902, an operating system 1904, a memory 1906, and an input/output I/O interface 1908. In various implementations, processor 1902 may be used to implement various functions and features described herein, as well as to perform the method implementations described herein. While processor 1902 is described as performing implementations described herein, any suitable component or combination of components of computing system 1900 or any suitable processor or processors associated with computing system 1900 or any suitable system may perform the steps described. Implementations described herein may be carried out on a user device, on a server, or a combination of both.

Computing system 1900 also includes a software application 1910, which may be stored on memory 1906 or on any other suitable storage location or computer-readable medium. Software application 1910 provides instructions that enable processor 1902 to perform the implementations described herein and other functions. Software application may also include an engine such as a network engine for performing various functions associated with one or more networks and network communications. The components of computing system 1900 may be implemented by one or more processors or any combination of hardware devices, as well as any combination of hardware, software, firmware, etc.

For ease of illustration, FIG. 19 shows one block for each of processor 1902, operating system 1904, memory 1906, I/O interface 1908, and software application 1910. These blocks 1602, 1604, 1606, 1608, and 1610 may represent multiple processors, operating systems, memories, I/O interfaces, and software applications. In various implementations, computing system 1900 may not have all components shown and/or may have other elements including other types of components instead of, or in addition to, those shown herein.

Although the description has been described with respect to particular embodiments thereof, these particular embodiments are merely illustrative, and not restrictive. For example, while various embodiments herein are discussed with respect to mobile device BI application implementations, embodiments are not limited thereto. Various embodiments disclosed herein may be adapted for use with virtually any computer, including desktop computers. Furthermore, embodiments are not limited to facilitating conveying BI information, tools, and analytics.

In various implementations, program instructions or software instructions are stored on or encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A "computer" may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used herein, the term "and/or" should be interpreted to mean one or more items. For example, the phrase "A, B, and/or C" should be interpreted to mean any of: only A, only B, only C, A and B (but not C), B and C (but not A), and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for importing data using a client device with a client display screen, comprising: receiving a raw image including one or more areas of data;
    scanning the raw image to a table including a grid structure with grid cells arranged in columns and rows, and detect data of two or more of the grid cells;
    reading the data of the two or more of the grid cells into a first data structure by using a provisional data type;
    determining a final data type for the two or more grid cells;
    determining that the grid cells in a first row include column headers and that the grid cells in a first column include row headers;
    creating a second data structure including the final data type;
    filling the second data structure with representations of the data of the two or more grid cells converted to the final data type;
    receiving user input requesting display of the data of the two or more grid cells in a data visualization of the second data structure; and
    displaying the data visualization on the client display screen while also displaying the raw image.

2. The method of claim 1, wherein determining the final data type includes:
    determining a repeating first data type of the grid cells within a column, and/or determining a repeating second data type of the grid cells within a row.

3. The method of claim 1, wherein determining the column headers includes determining first data types of each of the grid cells within the first row, wherein the first data type are different than data type of respective grid cells in subsequent rows, and
    wherein determining the row headers includes determining second data types of each of the grid cells within the first column, wherein the second data types are different than the data type of respective grid cells in subsequent columns.

4. The method of claim 1, wherein the data visualization of the second data structure is chosen from a group of data structures comprising: a line chart, bar charts, pie chart, scatter plot, map, Gantt chart, heat map, timeline, and tree map.

5. The method of claim 1, wherein the provisional data type includes at least one of letters, digits, symbols, emoji, characters known in any alphabet, characters known in any non-alphabetic writing system, letter arrangements in Hangeul, or Chinese characters.

6. The method of claim 1, further comprising:
receiving user input to modify the data visualization; and
changing the data visualization according to the user input to modify.

7. The method of claim 1, further comprising:
receiving user input to update or change the representation of the data in the data visualization; and
updating or changing the data according to the user input to update or change.

8. The method of claim 1, further comprising:
determining two or more columns of the table by:
detecting text blocks in at least a portion of the data; and
determining a narrow aspect ratio of the text blocks.

9. An apparatus comprising one or more processors in communication with a display screen and to one or more a non-transitory storage media including one or more instructions executable by the one or more processors to perform operations comprising:
receiving a raw image including one or more areas of data;
scanning the raw image to a table including a grid structure with grid cells arranged in columns and rows, and detect data of two or more of the grid cells;
reading the data of two or more of the grid cells into a first data structure by using a provisional data type;
determining a final data type for the two or more grid cells;
determining that the grid cells in a first row include column headers and that the grid cells in a first column include row headers;
creating a second data structure including the final data type;
filling the second data structure with representations of the data of the two or more grid cells converted to the final data type;
receiving user input requesting display of the data of the two or more grid cells in a data visualization of the second data structure; and
displaying the data visualization on a client display screen while also displaying the raw image.

10. The apparatus of claim 9, wherein determining the final data type includes:
determining a repeating first data type of the grid cells within a column, and/or determining a repeating second data type of the grid cells within a row.

11. The apparatus of claim 9, wherein determining the column headers includes determining first data types of each of the grid cells within the first row, wherein the first data type are different than data type of respective grid cells in subsequent rows, and
wherein determining the row headers includes determining second data types of each of the grid cells within the first column, wherein the second data types are different than the data type of respective grid cells in subsequent columns.

12. The apparatus of claim 9, wherein the data visualization of the second data structure is chosen from a group of data structures comprising: a line chart, bar charts, pie chart, scatter plot, map, Gantt chart, heat map, timeline, and tree map.

13. The apparatus of claim 9, wherein the operations further comprise:
receiving user input to modify the data visualization; and
changing the data visualization according to the user input to modify.

14. The apparatus of claim 9, wherein the operations further comprise:
receiving user input to update or change the representation of the data in the data visualization; and
updating or changing the data according to the user input to update or change.

15. A non-transitory computer-readable storage medium carrying program instructions thereon, the instructions when executed by one or more processors, cause the one or more processors to perform operations comprising:
receiving a raw image including one or more areas of data;
scanning the raw image to a table including a grid structure with grid cells arranged in columns and rows, and detect data of two or more of the grid cells;
reading the data of two or more of the grid cells into a first data structure by using a provisional data type;
determining a final data type for the two or more grid cells;
determining that the grid cells in a first row include column headers and that the grid cells in a first column include row headers;
creating a second data structure including the final data type;
filling the second data structure with representations of the data of the two or more grid cells converted to the final data type;
receiving user input requesting display of the data of the two or more grid cells in a data visualization of the second data structure; and
displaying the data visualization on a client display screen while also displaying the raw image.

16. The storage medium of claim 15, wherein determining the final data type includes:
determining a repeating first data type of the grid cells within a column, and/or determining a repeating second data type of the grid cells within a row.

17. The storage medium of claim 15, wherein determining the column headers includes determining first data types of each of the grid cells within the first row, wherein the first data type are different than data type of respective grid cells in subsequent rows, and
wherein determining the row headers includes determining second data types of each of the grid cells within the first column, wherein the second data types are different than the data type of respective grid cells in subsequent columns.

18. The storage medium of claim 15, wherein the operations further comprise:
determining two or more columns of the table by:
detecting text blocks in at least a portion of the data; and
determining a narrow aspect ratio of the text blocks.

19. The storage medium of claim 15, wherein the operations further comprise:
receiving user input to modify the data visualization; and
changing the data visualization according to the user input to modify.

20. The storage medium of claim 15, wherein the operations further comprise:
receiving user input to update or change the representation of the data in the data visualization; and
updating or changing the data according to the user input to update or change.

* * * * *